United States Patent
Ueda et al.

(10) Patent No.: US 7,254,254 B2
(45) Date of Patent: Aug. 7, 2007

(54) METHOD OF EVALUATING QUALITY OF IMAGE AND USE THEREOF

(75) Inventors: Masashi Ueda, Nagoya (JP); Takuma Kuno, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 11/277,685

(22) Filed: Mar. 28, 2006

(65) Prior Publication Data

US 2006/0222262 A1    Oct. 5, 2006

(30) Foreign Application Priority Data

Mar. 29, 2005  (JP) ............................. 2005-093537
Mar. 29, 2005  (JP) ............................. 2005-093538

(51) Int. Cl.
*G06K 9/00* (2006.01)

(52) U.S. Cl. ..................................... 382/112

(58) Field of Classification Search ................ 382/112, 382/254, 255, 274, 260–266, 275; 348/683; 358/1.9, 448, 461, 463, 2.1
See application file for complete search history.

(56) References Cited

U.S. PATENT DOCUMENTS

| | | | |
|---|---|---|---|
| 5,006,708 A | * | 4/1991 | Itoh et al. .................. 250/587 |
| 5,566,245 A | * | 10/1996 | Zheng et al. ................ 382/112 |
| 5,963,654 A | * | 10/1999 | Prakash et al. ............. 382/112 |
| 6,275,600 B1 | * | 8/2001 | Banker et al. .............. 382/112 |
| 6,351,546 B1 | * | 2/2002 | Murayama et al. ......... 382/112 |
| 6,571,000 B1 | * | 5/2003 | Rasmussen et al. ........ 382/112 |

FOREIGN PATENT DOCUMENTS

| | | |
|---|---|---|
| JP | H1 286084 | 11/1989 |
| JP | H6 233013 | 8/1994 |
| JP | H7 220083 | 8/1995 |
| JP | 2000 188647 | 7/2000 |
| JP | 2000 194852 | 7/2000 |
| JP | 2000 207560 | 7/2000 |

* cited by examiner

*Primary Examiner*—Matthew C. Bella
*Assistant Examiner*—Brian Le
(74) *Attorney, Agent, or Firm*—Baker Botts, L.L.P.

(57) ABSTRACT

A method of evaluating the quality of an image includes a step of determining at least a parameter concerning a zone or a parameter concerning a distribution pattern of sampling points within the zone. This step is performed based on the image. For each zone, Fourier analysis is performed using the optical characteristic values of the respective sampling points within the zone, and the image quality of each zone is obtained. The quality of the image is then determined based on the image quality of each zone within the image. A suitable zone and distribution pattern of sampling points are employed in evaluating the quality of an image.

12 Claims, 17 Drawing Sheets

FIG. 3

| Spot of Observation AR | Viewing Distance lw | Viewing Situation | Image Size | Image Type | Precision Requested for Detection of Microscopic Noises | Frequency of Noise Requested to be Precisely Detected |
|---|---|---|---|---|---|---|
| Small ↔ Large | Short ↔ Long | Intent Watching ↔ Abstracted Viewing | Small ↔ Large | Photograph of Size L or E ↔ Text ↔ Poster | Low ↔ High | High ↔ Low |

$\Sigma SP = (S_{UA}/p)^2$

FIG. 8

| Pitch of Sampling Points | Precision in Detecting High-Frequency Noises | Precision in Detecting Microscopic Noises | Spot of Observation AR | Processing Time Required for One Zone $t_{UA}$ | Processing Time Required for Entire Object Image $\sum t_{UA}$ |
|---|---|---|---|---|---|
| Small ↔ Large | High ↔ Low | High ↔ Low | Small ↔ Large | Long ↔ Short | Long ↔ Short |

FIG. 10

| Size $S_{UA}$ of Zone UA | Precision in Detecting Low-Frequency Noises | Precision in Detecting Microscopic Noises | Spot of Observation AR | Processing Time Required for One Zone | Processing Time Required for Entire Object Image |
|---|---|---|---|---|---|
| Small ↕ Large | Low ↕ High | High ↕ Low | Small ↕ Large | Short ↕ Long | Long ↕ Short |

(a) Image Evaluation Parameter
Mode($\alpha$): $S_{UA}(\alpha), \beta(\alpha)$

| Mode(1) | Mode(2) | Mode(3) | Mode(4) |
|---------|---------|---------|---------|
| $S_{UA}(1)$ < | $S_{UA}(2)$ < | $S_{UA}(3)$ < | $S_{UA}(4)$ |
| p(1) < | p(2) < | p(3) < | p(4) |

Spot of Observation AR
Large ← → Small (b)

METHOD OF EVALUATING QUALITY OF IMAGE AND USE THEREOF

CROSS-REFERENCE TO RELATED APPLICATIONS

This application claims priority to Japanese Patent Applications No. 2005-093537 and No. 2005-093538 filed on Mar. 29, 2005, the contents of which are hereby incorporated by reference into the present application.

BACKGROUND OF THE INVENTION

1. Field of the Invention

The present invention relates to a method of evaluating the quality of an image, a device for assisting in evaluating the quality of an image, an image forming device, and a computer program product for implementing the method of evaluating the quality of an image.

2. Description of the Related Art

Printed images and images loaded into a computer or the like via a scanner or from a digital camera contain defects that are called noises. The image noise (hereinafter referred to as a noise) is a cyclical variation in an optical characteristic (hue, brightness, saturation, or the like) occurring irrespective of an original image. In images, various noises occur depending on the performance of a printer that prints the images, that of the scanner via which the images are loaded, or that of the digital camera from which the images are loaded. For example, a noise that is short in the cycle of a variation in the optical characteristic (hereinafter referred to as a high-frequency noise) or a noise that is long in the cycle of a variation therein (hereinafter referred to as a low-frequency noise) may occur. Moreover, noises may occur linearly or circularly. In any case, an image containing many noises is recognized as an image of poor quality when it is viewed by human beings.

A known method is such that the foregoing noises are detected by performing Fourier analysis on an image to evaluate the quality of the image. According to the method of evaluating the quality of an image, zones having a predetermined shape are delineated in an image, and sampling points are disposed within the delineated zone. Thereafter, the positions of the sampling points are identified and optical characteristic values thereof are detected. The optical characteristic to be detected may be any of various optical characteristics, that is, a hue, brightness, and saturation. After the optical characteristic values of the respective sampling points are detected, Fourier analysis is performed on data items each representing the identified position and optical characteristic value of each sampling point to detect noises in respective zones. After noises are detected, the image quality of respective zones is assessed based on the noises. Consequently, the quality of the image is evaluated based on the image qualities of respective zones. When the quality of an image is evaluated as mentioned above, noises can be detected and the quality of the image can be evaluated.

According to the conventional method of evaluating the quality of an image, a parameter concerning a zone to be delineated in an image, that is, a shape or a size is predetermined but will not be changed. Moreover, a parameter concerning a distribution pattern of sampling points, that is, positions of sampling points, a distance between adjoining sampling points, and the number of sampling points are also predetermined but will not be changed. Zones are delineated in the same manner for any image and sampling points are disposed within each zone in the same manner for any image to evaluate the quality of the image.

SUMMARY OF THE INVENTION

The parameter concerning a zone and the parameter concerning a distribution pattern of sampling points greatly affect the precision in detecting noises through Fourier analysis. For example, when relatively small zones are delineated in an image to perform Fourier analysis, the precision in detecting microscopic noises, which occur locally, improves. However, the precision in detecting low-frequency (long-cycle) noises is degraded. When the density of sampling points increases, the precision in detecting high-frequency (short-cycle) noises is upgraded. However, a processing time required for Fourier analysis gets longer.

Moreover, a situation in which an image is viewed varies depending on the size or type thereof. For example, a relatively large image such as a poster is viewed relatively at a distance. A photograph or the like is intently watched relatively at close range. When a human being views an image at a distance, he/she is likely to discern low-frequency (long-cycle) noises. In contrast, when a human being views an image at close range, he/she is likely to discern high-frequency (short-cycle) noises. When a human being watches an image intently, he/she is likely to discern the high-frequency (short-cycle) noises. In contrast, when a human being views an image abstractedly, he/she is likely to discern the low-frequency (long-cycle) noises. When a human being views an image at close range, he/she is likely to discern microscopic noises that have occurred locally. Thus, the required quality of an image varies depending on a situation in which the image is viewed. Consequently, when an image is evaluated, a parameter concerning a zone and a parameter concerning a distribution pattern of sampling points should preferably be optimized for the image to be evaluated so that image evaluation can be achieved optimally for the image.

However, in the conventional method of evaluating the quality of an image, the parameter concerning a zone and the parameter concerning a distribution pattern of sampling points are fixed to certain values. Therefore, image evaluation cannot be performed optimally for an image to be evaluated Consequently, the conventional method of evaluating the quality of an image fails to achieve image evaluation property because an image is evaluated with a precision that is too low for the expected quality of the image. Otherwise, the conventional method requires too much time for image evaluation because an image is evaluated with an excessively high precision.

The present invention provides a method of evaluating the quality of an image which can evaluate an image with a precision suitable for the image to be evaluated.

The present invention provides a device for assisting in evaluating the quality of an image which can arbitrarily designate a parameter concerning a zone and a parameter concerning a distribution pattern of sampling points and achieve image evaluation according to the designated parameters.

The present invention provides an image forming device capable of arbitrarily designating a parameter concerning a zone and a parameter concerning a distribution pattern of sampling points and of performing image evaluation on a formed image according to the designated parameters.

The present invention provides a computer program product capable of arbitrarily designating a parameter concerning a zone and a parameter concerning a distribution pattern of sampling points and of achieving image evaluation according to the designated parameters.

A method of evaluating the quality of an image in accordance with the present teaching comprises a step of determining at least one of a parameter concerning a zone or a parameter concerning a distribution pattern of sampling points within the zone. The parameter concerning the zone preferably describes the size or shape of each zone. The parameter concerning the distribution pattern of sampling points within the zone preferably describes a distance between adjacent sampling points, the number of sampling points, or the like. The parameter is determined according to the image.

In the evaluation method, the step of determining the parameter is succeeded by: a step of identifying data that indicates position and optical characteristic value of each of the sampling points within the zone which are determined at least partially based on the determined parameter; a step of performing Fourier analysis on the identified data relevant to each zone to obtain an image quality of the zone; and a step of determining the quality of the image on the basis of the image quality of each zone.

According to the evaluation method, at least one of the parameter concerning a zone and the parameter concerning a distribution pattern of sampling points is designated based on an image. Data indicating the position and optical characteristic value of each of disposed sampling points is identified, and Fourier analysis is performed on the identified data. Since at least one of the parameter concerning a zone and the parameter concerning the distribution pattern of sampling points is designated based on the image, Fourier analysis is performed with a precision appropriate for the image to calculate the image quality of the zone. Based on the thus calculated image qualities of respective zones, the quality of the image is identified. The present evaluation method makes it possible to evaluate the quality of an image with a precision appropriate for the image.

Moreover, the present invention provides a novel device for assisting in evaluating the quality of an image. The device for assisting in evaluating the quality of an image includes: means for determining at least one of a parameter concerning a zone and a parameter concerning a distribution pattern of sampling points within the zone according to the image; means for identifying data that indicates position and optical characteristic value of each of the sampling points within the zone which are determined at least partially based on the determined parameter; means for performing Fourier analysis on the identified data relevant to each zone to obtain an image quality of the zone; and means for determining the quality of the image on the basis of the image quality of each zone.

According to the device for assisting in evaluating the quality of an image, the parameter concerning a zone and the parameter concerning a distribution pattern of sampling points are designated based on an image, and an index helpful in evaluating an image is produced based on the designated parameters.

Moreover, the present invention provides a novel image forming device. The image forming device includes: means for forming an image, such as, a printer; means for determining at least one of a parameter concerning a zone and a parameter concerning a distribution pattern of sampling points within the zone; means for measuring the optical characteristic value of the formed image at least at each of the sampling points within the zone which are determined at least partially based on the determined parameter; means for performing Fourier analysis on the measured optical characteristic values of the respective sampling points within each zone to obtain an image quality of the zone; and means for determining a quality of the image on the basis of the image quality of each zone.

According to the image forming device, not only an image is formed but also the quality of the formed image can be evaluated. When image evaluation is performed on a formed image, the parameter concerning a zone and the parameter concerning a distribution pattern of sampling points are designated based on the image. Consequently, the formed image can be evaluated by utilizing the zone and sampling points appropriate for the evaluation.

Moreover, the present invention provides a computer program product capable of implementing a method of evaluating the quality of an image. The computer program product in accordance with the present teaching makes a computer to perform the following processes: a process for determining at least one of a parameter concerning a zone and a parameter concerning a distribution pattern of sampling points within the zone; a process for identifying data that indicates position and optical characteristic value of each of the sampling points within the zone which are determined at least partially based on the determined parameter; a process for performing Fourier analysis on the identified data relevant to each zone to obtain an image quality of the zone; and a process for determining the quality of the image on the basis of the image quality of each zone.

According to the computer program product, the parameter concerning a zone and the parameter concerning a distribution pattern of sampling points are designated based on an image, and the quality of the image is evaluated based on the designated parameters.

BRIEF DESCRIPTION OF THE DRAWINGS

FIG. 3 is a table illustratively showing the correlation among a spot of observation, a viewing distance, a viewing situation, an image size, an image type, a precision requested for detection of microscopic noises, and a frequency of noises requested to be detected precisely;

FIG. 8 is a table illustratively showing the correlation among a pitch of sampling points, a precision in detecting high-frequency noises, a precision in detecting microscopic noises, the size of a spot of observation whose image quality can be properly evaluated, a processing time required for Fourier analysis to be performed on one zone, and a processing time required for Fourier analysis to be performed on an entire image;

FIG. 10 is a table illustratively showing the correlation among the size Of a zone, a precision in detecting low-frequency noises, a precision in detecting microscopic noises, the size of a spot of observation whose image quality can be properly evaluated, a processing time required for Fourier analysis to be performed on one zone, and a processing time required for Fourier analysis to be performed on an entire image;

DETAILED DESCRIPTION OF THE INVENTION

Figure 1:
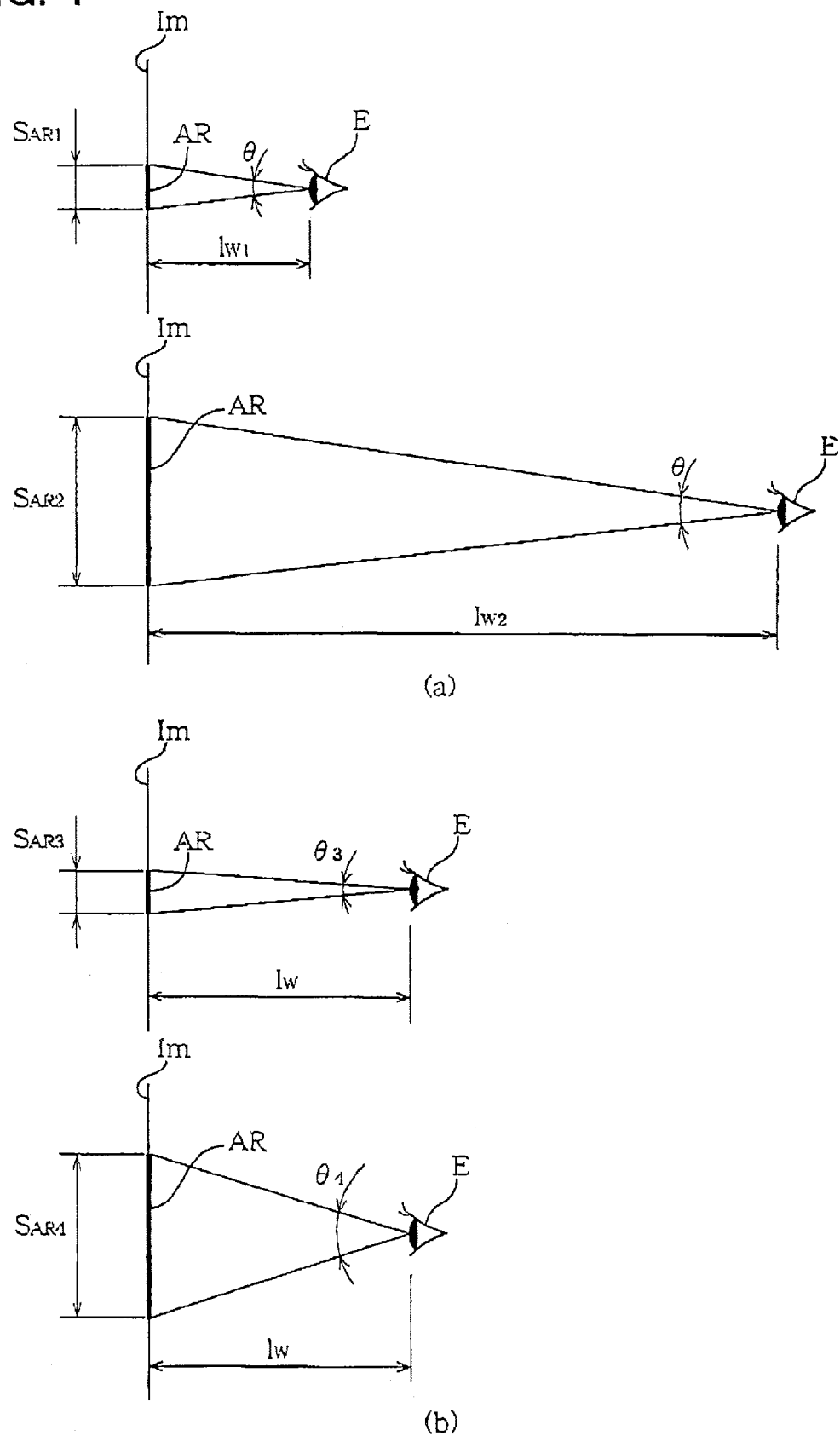
FIG. 1(a) and FIG. 1(b) illustratively show the relationship among a viewing distance of an object image, a viewing situation, and the size of a spot of observation in the image.

Referring to the drawings, embodiments of the present invention will be described below.

<Relationship Between the Size of a Spot of Observation and a Condition for Image Evaluation>

In image evaluation in which an embodiment of the present invention is implemented, a range in an image which a human being generally watches while viewing the image is defined as a spot of observation. An image evaluation parameter is designated based on the spot of observation. Prior to description of exemplary embodiments, the spot of observation and the image evaluation parameter based on the spot of observation will be mentioned below.

When a human being views an image, a spot of observation varies depending on various factors. For example, as shown in FIG. 1(a), when an image Im is viewed at close range, size $S_{AR1}$ of spot of observation AR is small. In contrast, when image Im is viewed at a distance, size $S_{AR2}$ of spot of observation AR is large. Namely, as long as view angle θ remains equal, the longer a viewing distance $l_w$ that is a distance of an image from an observer is, the larger the area $S_{AR}$ of the spot of observation AR is.

Spot of observation AR varies depending on sensory, psychological, and conscious factors. For example, as shown in FIG. 1(b), even when viewing distance $l_w$ remains unchanged, if image Im is viewed abstractedly, view angle θ gets wider and size $S_{AR4}$ of spot of observation AR gets larger. In contrast, when image Im is watched intently, view angle θ gets narrower and size $S_{AR3}$ of spot of observation AR gets smaller.

When a human being views an image, a viewing distance and a view angle vary depending on the size of the image and the type of image.

In general, large images are viewed at a distance. Moreover, since the large image is viewed abstractedly, the view angle is wide. In contrast, small images are viewed at close range. Moreover, since the small image is watched intently, the view angle is narrow. Consequently, the larger the size of an image is, the larger the spot of observation AR is. In contrast, the smaller the size of an image is, the smaller the spot of observation AR is.

In general, posters or the like are viewed at a distance. Moreover, since the poster is viewed abstractedly, the view angle is wide. Consequently, spot of observation AR is large. Photographs (relatively small photographs having a postcard size) are viewed at close range. Moreover, since the photograph is watched intently, the view angle is narrow. Consequently, spot of observation AR is small. Text is not watched so intently as the photograph is. Spot of observation AR in text is thought to be larger than that in the photograph.

Figure 2:
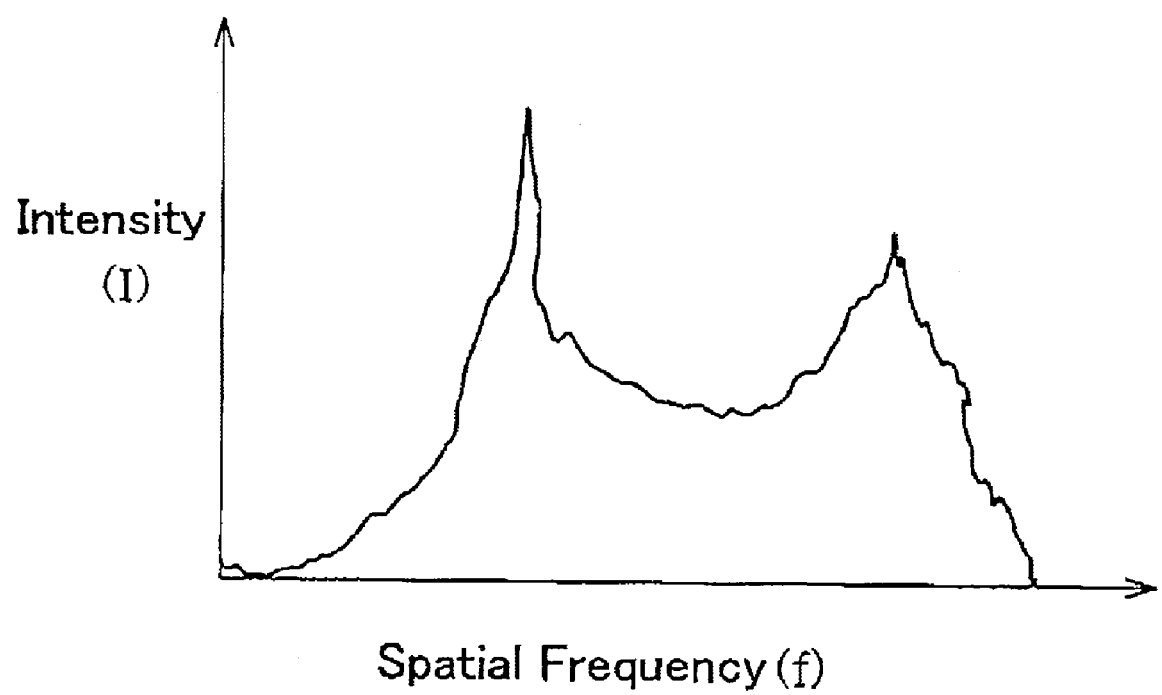
FIG. 2 illustratively shows an example of a power spectrum resulting from spatial frequency analysis.

Moreover, generally, images contain defects referred to as noises. The noise is a cyclic variation in an optical characteristic (hue, brightness, saturation, or the like) occurring irrespective of an original image during formation of the image. FIG. 2 shows the results of evaluation performed on noises in a predetermined image through Fourier analysis. As shown in FIG. 2, the image contains noises of various frequencies (spatial frequency f). When noises occur in an image at a predetermined intensity or higher, the noises are discerned by a human being. Whether a human being discerns noises depends greatly on size of a spot of observation AR in an image viewed thereby.

When a human being views an image, as spot of observation AR is smaller, a high-frequency (short-cycle) defect (a defect caused by noises of a high spatial frequency f) becomes more discernible but a low-frequency defect (a defect caused by noises of a low spatial frequency f) becomes more indiscernible. In contrast, as spot of observation AR is larger, the high-frequency defect becomes more indiscernible but the low-frequency (long-cycle) defect becomes more discernible.

To be more specific, luminous efficiency Sen relative to a spatial frequency on a human retina chances along with spatial frequency ff relative to an angle of incidence on the retina (cycle/degree).

$$Sen(ff)=5.05*EXP(-0.138*ff)*(1-EXP(-0.1*ff))$$

Figure 7:
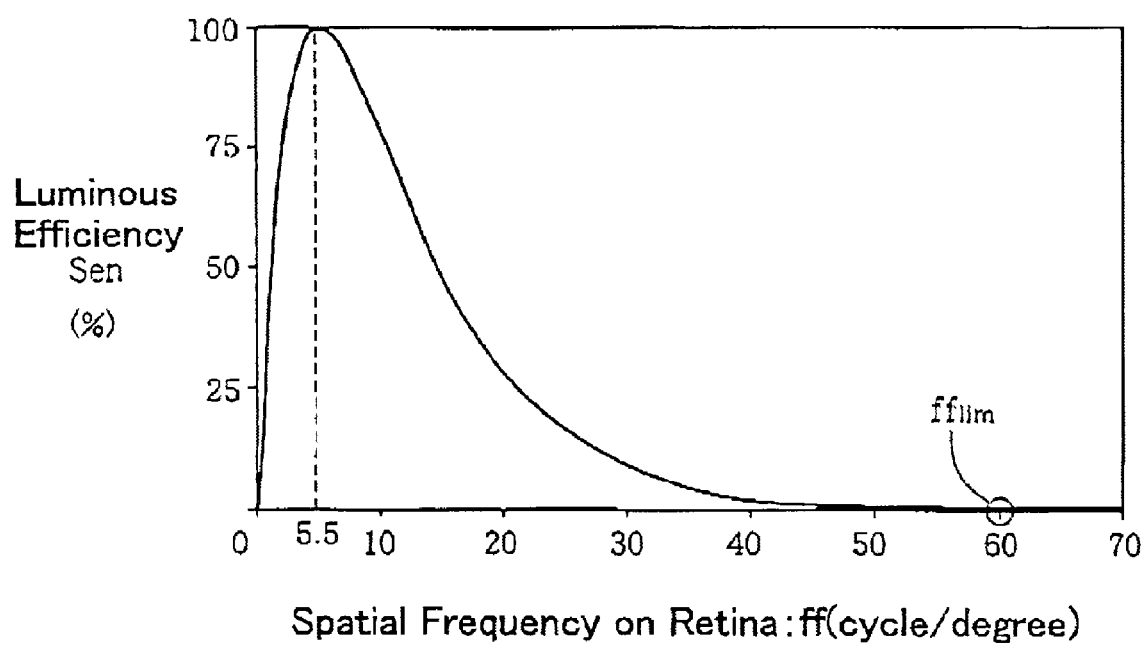
FIG. 7 is a graph showing a characteristic curve of a luminous efficiency with respect to a spatial frequency on a retina.

FIG. 7 is a graph showing a characteristic curve between the luminous efficiency and spatial frequency. As seen from FIG. 7, the peak of luminous efficiency Sen is a spatial frequency of approximately 5.5 cycles per degree. Spatial frequency f (cycle/mm) and spatial frequency ff (cycle/degree) relative to an angle of incidence have a relationship expressed below.

$$f=\theta \cdot ff/(lw*\tan(\theta))$$

As apparent from the expression, when viewing distance lw is shorter (that is, spot of observation AR is smaller), a human being can discern a high-frequency defect more distinctly. When viewing distance lw is longer, the human being can discern a low-frequency defect more distinctly. Moreover, the smaller a view angle θ is (that is, the smaller the spot of observation AR is), the more distinctly the high-frequency defect is discerned. The larger the view angle θ is, the more distinctly the low-frequency defect is discerned.

Figure 5:
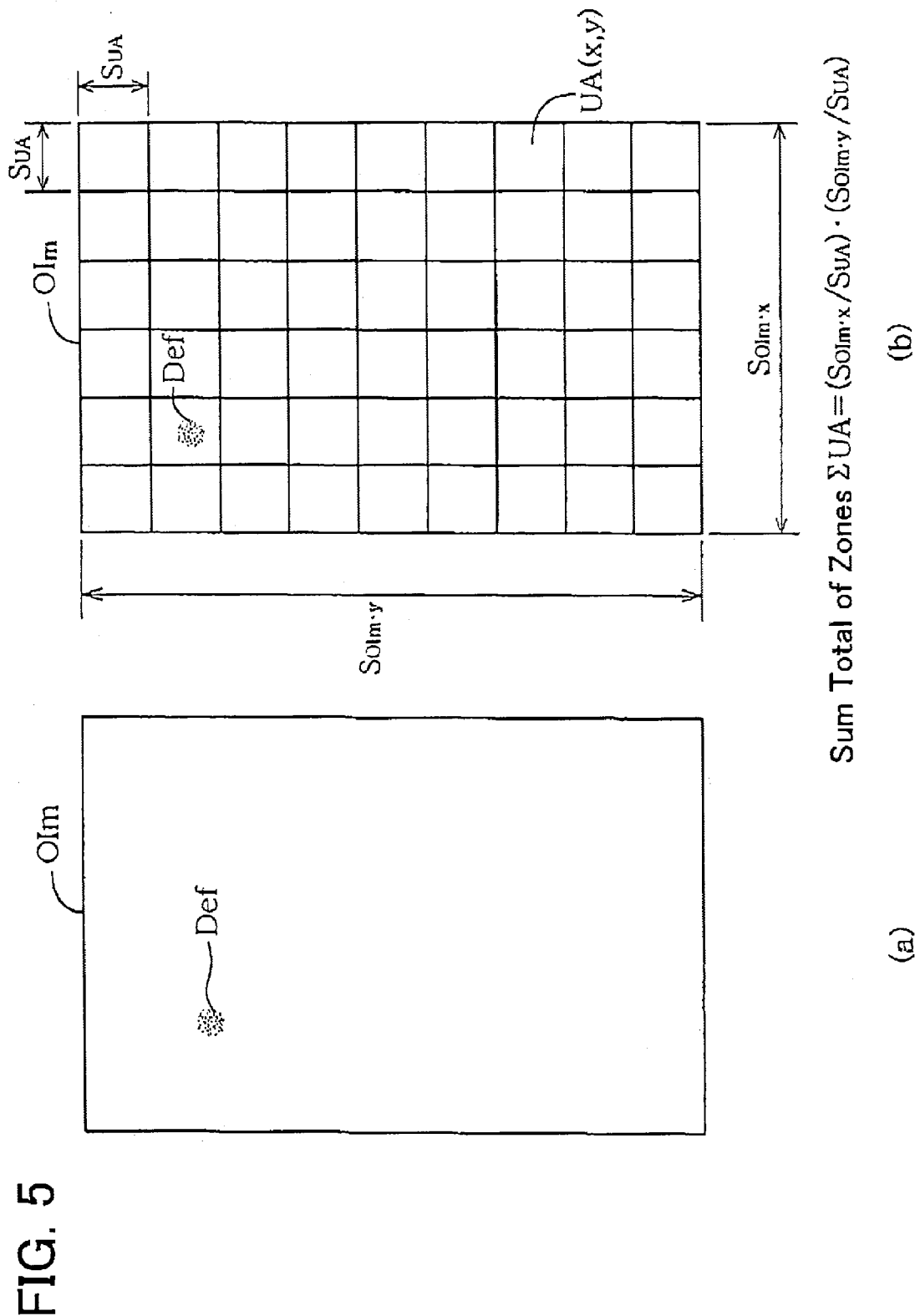
FIG. 5(a) and FIG. 5(b) illustratively show a defect in an image and zones delineated in an image.

Moreover, as shown in FIG. 5(a), an image may contain microscopic defects Def caused by local noises. As spot of observation AR is smaller, human beings can discern the microscopic defects more distinctly. In contrast, as spot of observation AR is larger, the microscopic defects become more indiscernible. Moreover, when an image partly contains microscopic defects, the human being tends to recognize the quality of the image unfavorably. In other words, the human being tends to evaluate the quality of an image on the basis of the portion of the image exhibiting the poorest quality.

As mentioned above, when spot of observation AR is smaller, human beings can discern a high-frequency defect more distinctly. Moreover, when spot of observation is smaller, the human being can discern microscopic defects more distinctly. Therefore, for evaluation of the quality of an image having small spot of observation AR, the high-frequency noises and microscopic noises should be detected with greater precision.

In contrast, when spot of observation AR is larger, the human being can discern a low-frequency defect more distinctly. Therefore, for evaluation of the quality of an image having large spot of observation AR, the low-frequency noises should be detected with greater precision.

FIG. 3 is a table illustratively showing what have been described so far. The table of FIG. 3 shows the correlation among a spot of observation, a viewing distance, a viewing situation, an image size, an image type, a precision requested for detection of microscopic noises, and a frequency of noises requested to be precisely detected.

Figure 4:
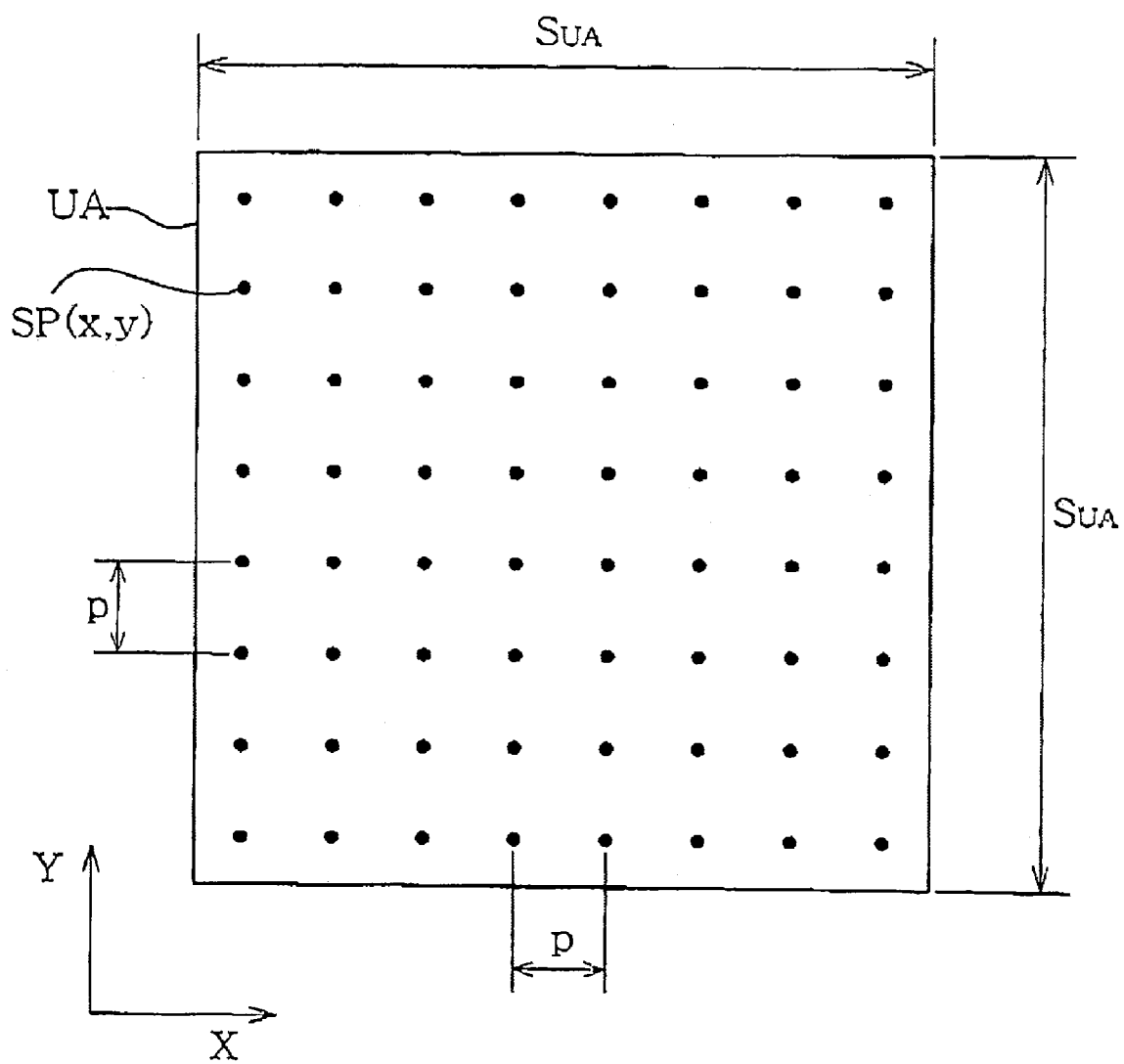
FIG. 4 illustratively shows a zone on which Fourier analysis is performed.

In a typical method of evaluating the quality of an image through Fourier analysis, as shown in FIG. 4, zone UA having a predetermined size is delineated in an image, and a plurality of sampling points SP is disposed within zone UA in the form of a matrix. Fourier analysis is performed based on optical characteristic values detected at respective sampling points SP.

Zone UA is a zone in units of which Fourier analysis is performed on the image. Zone UA is square and has sides $S_{UA}$. The size of zone UA is represented by the length of one side $S_{UA}$. The sides of zone UA extend in an X direction and a Y direction.

Sampling points SP are disposed in the X and Y directions in the form of a matrix. Sampling points SP are arranged so that the distance between adjoining sampling points SP (hereinafter referred to as a pitch) will be distance p. Each of sampling points SP is expressed as SP(x,y) using x- and y-coordinates defined in zone UA. Sum total $\Sigma$SP of sampling points SP in zone UA is broadly expressed as $(S_{UA}/P)^2$.

Moreover, in the general method of evaluating the quality of an image, as shown in FIG. 5(b), entire image OIm that is an object of evaluation is regarded as a domain to be subjected to image evaluation (hereinafter an evaluative domain). The evaluative domain is divided into zones UA. Each of zones UA is expressed as UA(x,y) using x- and y-coordinates. Assuming that the lengths in the X and Y directions of image OIm are defined as X-direction sizes $S_{OIm \cdot x}$ and Y-direction sizes $S_{OIm \cdot y}$ respectively, sum total $\Sigma$UA of zones UA is broadly expressed as $(S_{OIm \cdot x}/S_{UA})\cdot(S_{OIm \cdot y}/S_{UA})$. As shown in FIG. 5(a), when image OIm contains microscopic defects Def, the noises are detected in any of zones UA into which the image is segmented as shown in FIG. 5(b).

Figure 6:
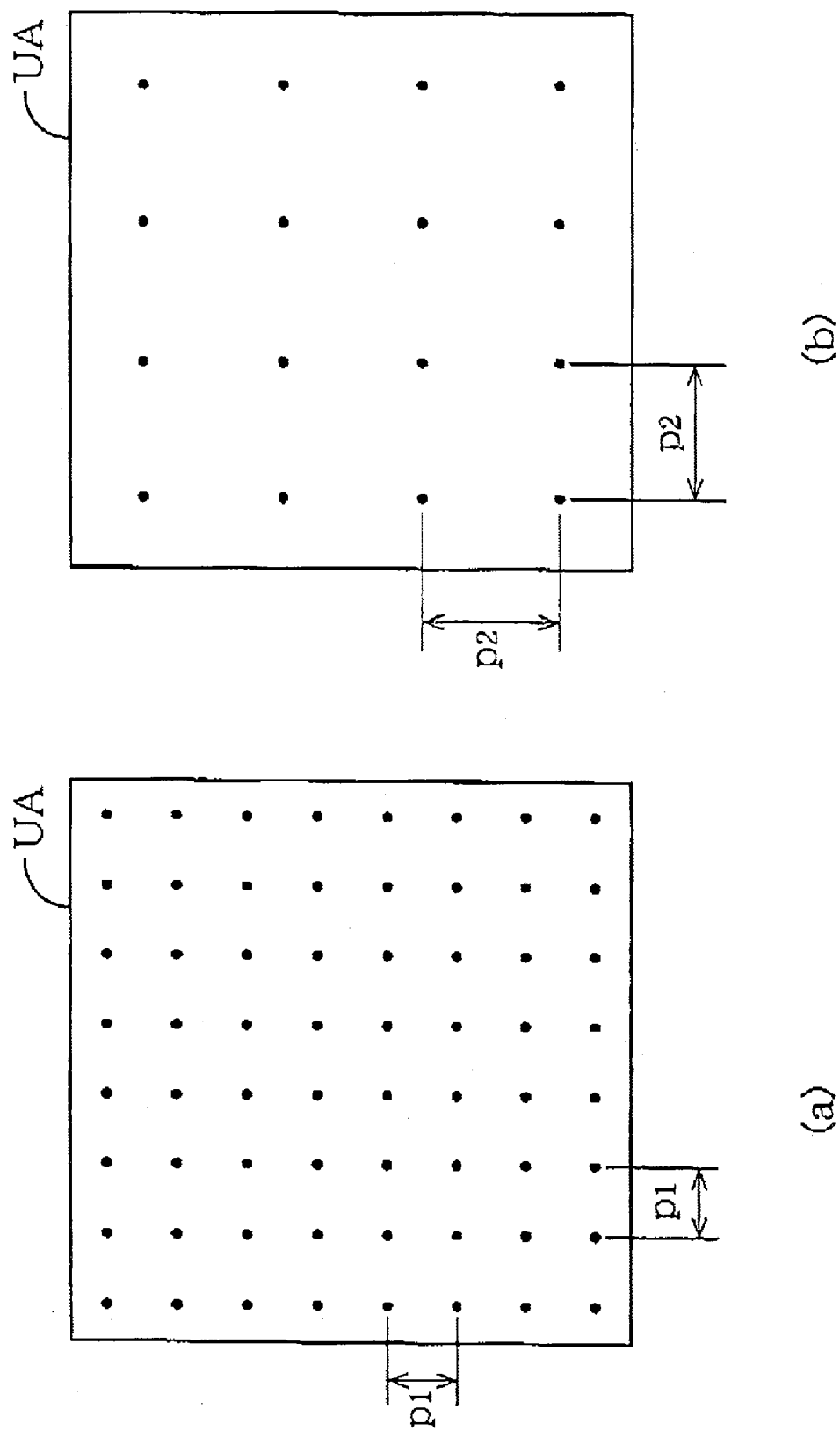
FIG. 6(a) and FIG. 6(b) illustratively show a difference in a pitch of sampling points.

Pitch p of sampling points determines Nyquist frequency $f_{NA}$ serving as a higher limit detectable through Fourier analysis. The relationship between Nyquist frequency $f_{NA}$ (cycle/mm) and pitch p (mm) is expressed as $f_{NA}=1/(2*p)$. Consequently, when pitch p (pitch p1) is as small as that shown in FIG. 6(a), Nyquist frequency $f_{NA}$ is higher than that is when pitch p (pitch p2) is as large as that shown in FIG. 6(b).

Nyquist frequency $f_{NA}$ should be higher than frequency $f_{lim}$ (cycle/mm) serving as higher limit detectable by human beings. As mentioned above, luminous efficiency Sen relative to a spatial frequency on a human retina is plotted as the characteristic curve shown in FIG. 7. As shown in FIG. 7, the spatial frequency on the retina (limit spatial frequency $ff_{lim}$ on the retina) associated with a luminous efficiency of 0.1% is approximately 60 cycles/degree. Since spatial frequency ff (cycle/degree) on the retina and spatial frequency f(cycle/mm) have the aforesaid relationship, the human detectable limit frequency $f_{lim}$ (cycle/mm) is expressed as follows:

$$f_{lim}=\theta \cdot ff_{lim}/(lw*\tan(\theta))$$

As apparent from the above expression, when spot of observation AR in an image serving as an object of evaluation is small, detectable limit frequency $f_{lim}$ is high. Nyquist frequency $f_{NA}$ should therefore be high. Namely, pitch p of sampling points SP should be small. In contrast, when spot of observation AR is large, since detectable limit frequency $f_{lim}$ is low, Nyquist spatial frequency $f_{NA}$ may be low. Namely, pitch p may be large.

When pitch p of sampling points SP is smaller, sum total $\Sigma$SP of sampling points SP increases. Consequently, the precision in detecting microscopic noises is upgraded. As mentioned above, when spot of observation AR is smaller, a higher precision is requested for detection of microscopic noises. Consequently, when spot of observation AR is smaller, pitch p of sampling points SP should be smaller.

On the other hand, pitch p of sampling points SP affects a processing time required for Fourier analysis to be performed on zone UA. As seen from FIG. 6, the smaller the pitch p is, the larger the sum total $\Sigma$SP of sampling points SP is. Therefore, processing time $t_{UA}$ required for Fourier analysis to be performed on zone UA gets longer. In other words, processing time $\Sigma t_{UA}$ required for Fourier analysis to be performed on the entire object image OIm gets longer.

FIG. 8 is a table illustratively showing what have been described so far in relation to pitch p of sampling points SP. The table of FIG. 8 illustratively shows the correlation among pitch p of sampling points SP, a precision in detecting high-frequency noises, a precision in detecting microscopic noises, the size of a spot of observation whose image quality can be properly evaluated, a processing time required for Fourier analysis to be performed on one zone, and a processing time required for Fourier analysis to be performed on an entire image.

Size $S_{UA}$ of zone UA determines a precision in detecting microscopic noises. For example, as shown in FIG. 9(b), an object image containing microscopic defects Def is subjected to Fourier analysis in units of a relatively large zone UA. The ratio of defects Def to one zone UA is so small that the detectability of the noises stemming from defects Def decreases. Accordingly, the detecting precision is degraded. In contrast, when an image is evaluated in units of a relatively small zone UA, the ratio of defects Def to zone UA gets larger. Consequently, the delectability of the noises stemming from defects Def increases and the detecting precision is upgraded.

As described previously, when spot of observation AR is smaller, a higher precision is requested for detection of microscopic noises. Therefore, when spot of observation AR is small, size $S_{UA}$ of zone UA should be small.

Figure 9:
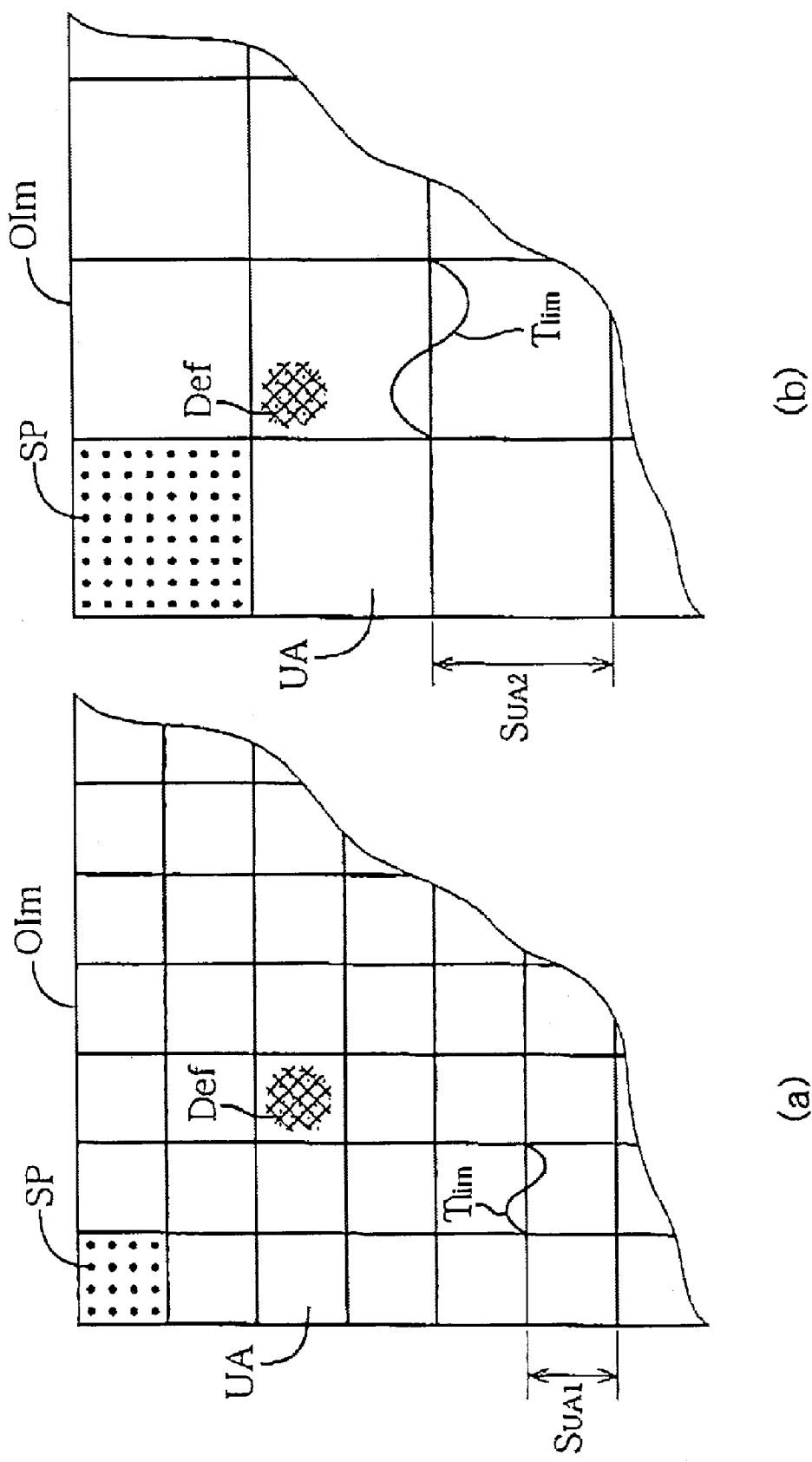
FIG. 9(a) and FIG. 9(b) illustratively show a difference in the size of a zone.

Through Fourier analysis, a noise whose cycle is longer than size $S_{UA}$ of zone UA cannot be detected. As shown in FIG. 9, a noise whose cycle $T_{lim}$ is equivalent to size $S_{UA}$ can be said to be a noise having a lower detectable limit frequency. When size $S_{UA}$ is small, the precision in detecting low-frequency noises is degraded.

As described previously, as spot of observation AR is larger, a higher precision is requested for detection of low-frequency noises. Therefore, when spot of observation AR is large, size $S_{UA}$ of zone UA should be large.

On the other hand, size $S_{UA}$ of zone UA affects a processing time required for Fourier analysis to be performed on zone UA. As seen from FIG. 9, when zone UA is larger, sum total ΣSP of sampling points SP gets larger. Consequently, processing time $t_{UA}$ required for Fourier analysis to be performed on one zone UA gets longer. Preferably, zone UA should be as small as possible. However, as far as processing time $\Sigma t_{UA}$ required for Fourier analysis to be performed on entire image OIm is concerned, the paradox is established. Namely, when zone UA is small, sum total ΣUA of zones UA delineated in image OIm is large Consequently, the processing time required for entire image OIm gets long.

In short, when size $S_{UA}$ of zone UA becomes 1/n, the processing time required for Fourier analysis to be performed on one zone UA (that is, the processing time $t_{UA}$ required for fast Fourier transform) becomes 1/(n·log(n)). On the other hand, sum total ΣUA of zones UA becomes $n^2$ times larger. Consequently, the smaller the zone UA is, the longer the processing time $\Sigma t_{UA}$ required for Fourier analysis to be performed on entire image OIm is.

FIG. 10 is a table illustratively showing what have been described in relation to size $S_{UA}$ of zone UA. The table of FIG. 10 illustratively shows the correlation among the size of a zone, a precision in detecting low-frequency noises, a precision in detecting microscopic noises, the size of a spot of observation whose image quality can be properly evaluated, a processing time required for Fourier analysis to be performed on one zone, and a processing time required for Fourier analysis to be performed on an entire image.

In consideration of the above description, exemplary embodiments will be described below.

First Embodiment

The first embodiment relates to a complex machine, or more particularly, to a printing device including a scanner. Printing device 10 in accordance with the present embodiment has the feature of evaluating the quality of an image printed by the printing device 10. The printing device 10 prints an image and evaluates the printed image.

(a) Hardware Configuration of the Printing Device

Figure 11:
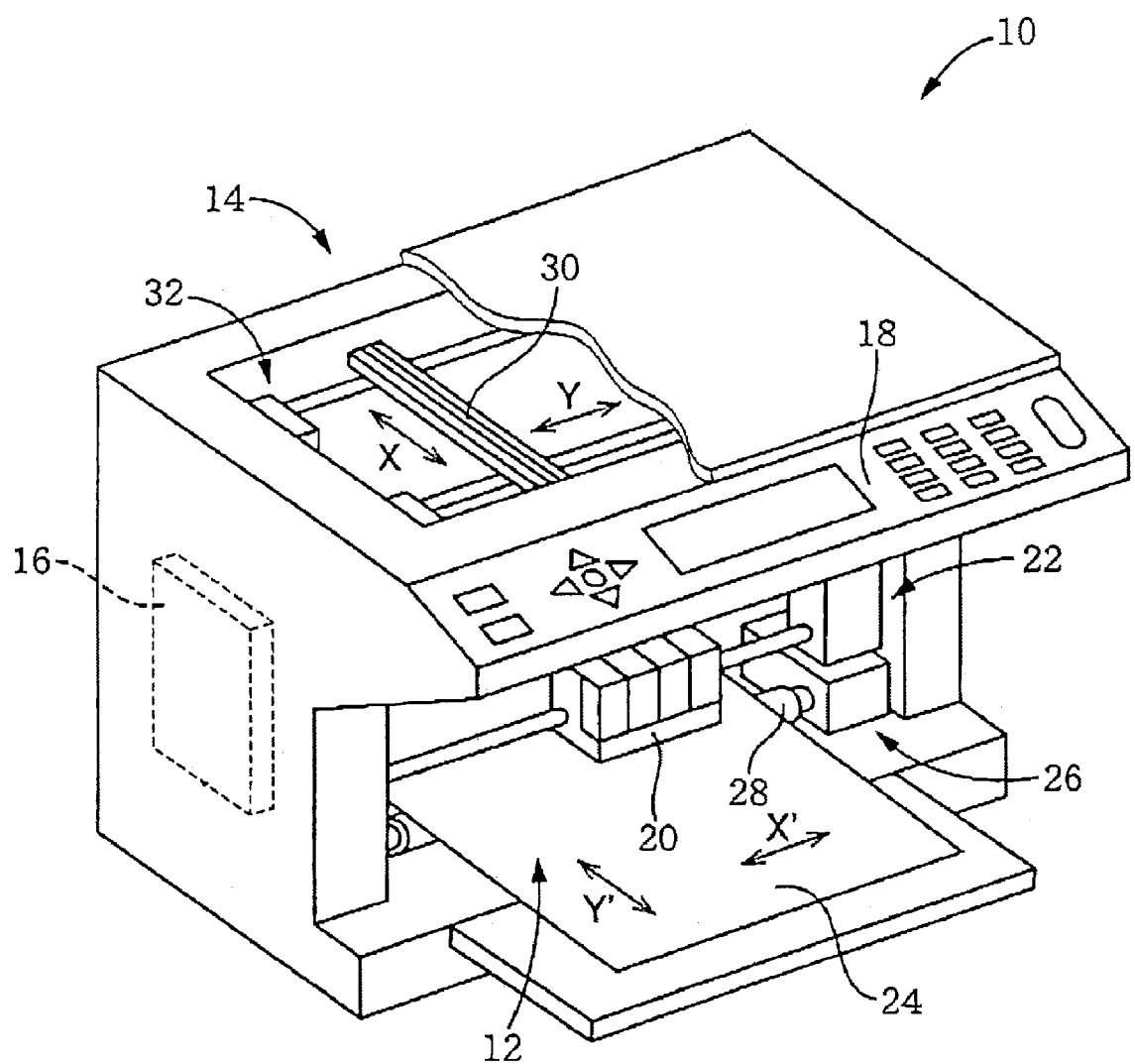
FIG. 11 is a perspective view of a printing device that can achieve image evaluation according to the first embodiment.

FIG. 11 is a perspective view showing the whole of printing device 10. Printing device 10 is an image forming device including an image scanner. Printing device 10 includes printer 12 that prints an image, scanner 14 that reads an image, control unit 16 that controls components, and operator panel 18.

Printer 12 is of an in-jet type having a typical structure. Printer 12 includes printing head 20, head mover 22, and paper transporter 26. Printer 12 prints an image on paper.

Printing head 20 includes numerous nozzles. Printing head 20 includes four containers filled with respective color inks of black (b), cyan (c), magenta (m) and yellow (y). Printing head 20 is electrically connected to control unit 16. Printing head 20 jets ink of each color through the nozzles according to an electric signal sent from control unit 16. Printing head 20 is fixed to head mover 22 so that the ink-jet side thereof will face downward. When head mover 22 is driven, scanning head 30 is moved in an X' direction in FIG. 11.

Head mover 22 is electrically connected to control unit 16. Head mover 22 moves printing head 20, which is fixed to head mover 22, in the X' direction according to an electric signal sent from control unit 16.

Paper transporter 26 is disposed to be opposed to the ink-jet side of printing head 20. Paper transporter 26 includes feed roller 28. Paper transporter 26 is electrically connected to control unit 16. Paper transporter 26 rotates feed roller 28 according to an electric signal sent from control unit 16. When feed roller 28 is rotated, sheets of A4 paper 24 that are supplied one by one from the back side of printing device 10 are transported in a Y' direction in FIG. 11. The sheets of paper 24 are transported so that they will pass between paper transporter 26 and printing head 20.

In printer 12, head mover 22 moves printing head 20 in the X' direction. When printing head 20 moves in the X' direction, a target position on a sheet of paper 24 to which printing head 20 jets ink is shifted in the X' direction Moreover, paper transporter 26 intermittently transports the sheet of paper 24 in the Y' direction. When the sheet of paper 24 is transported in the Y' direction, the target position on the sheet of paper 24 to which printing head 20 jets ink is shifted in the Y' direction. Printing head 20 is controlled to jet ink of a predetermined color to a predetermined target position. Consequently, an image is printed on the sheet of paper 24. Printer 12 can print various types of images including text and a photograph at different resolutions.

Scanner 14 is of a flat-bed type having a typical structure. Scanner 14 is electrically connected to control unit 16. Scanner 14 includes scanning head 30 and head mover 32.

Scanning head 30 is fixed to head mover 32. When head mover 32 is driven, scanning head 30 is moved in a Y direction in FIG. 11. Scanning head 30 has charge-coupled devices (CCDs), which are light receiving elements, and light-emitting diodes, which are light sources, juxtaposed linearly in an X direction. Scanning head 30 is electrically connected to control unit 16.

Head mover 32 is electrically connected to control unit 16. Head mover 32 moves scanning head 30 in the Y direction according to an electric signal sent from control unit 16.

A sheet of paper on which an image or the like is printed is placed on scanner 14. When an electric signal is transferred from control unit 16 to scanner 14, head mover 32 is driven to move scanning head 30 in the Y direction at a predetermined velocity. Concurrently, the CCDs and LEDs are started. The LEDs irradiate light to the printed sheet of paper, while the CCDs each detect a value representing the optical characteristic of light reflected from the face of the printed sheet of paper. Control unit 16 saves the optical characteristic values detected by the respective CCDs together with the positions of the CCDs (x-coordinates) and a magnitude of drive (y-coordinate) exerted by head mover 32 when the light is detected. Consequently, data representing the image on the sheet of paper mounted on scanner 14 is read by control unit 16. Scanner 14 can read image data at various resolutions. A maximum resolution offered by scanner 14 is higher than a maximum resolution offered by printer 12.

Operator panel 18 is electrically connected to control unit 16. Operator panel 18 includes a plurality of buttons. When a user manipulates any of the buttons, an electric signal is transmitted from operator panel 18 to control unit 16. Moreover, during image evaluation assistance, when a user manipulates any button, information on the size of spot of observation AR in an image to be evaluated is transferred to control unit 16. Moreover, operator panel 18 includes a display. Various pieces of information are displayed on the display, and the results of image evaluation are also displayed on the display.

Control unit 16 is realized mainly with a computer including a CPU, a RAM, a ROM, an image processing unit, an input/output interface, and a bus linking these components. Control unit 16 is electrically connected to each of printer 12, scanner 14, and operator panel 18. Control unit 18 controls the actions of printer 12 and scanner 14 according to an electric signal sent from operator panel 18. Moreover, control unit 16 evaluates an image printed by printer 12.

(b) Functional Configuration of the Control Unit

Figure 12:
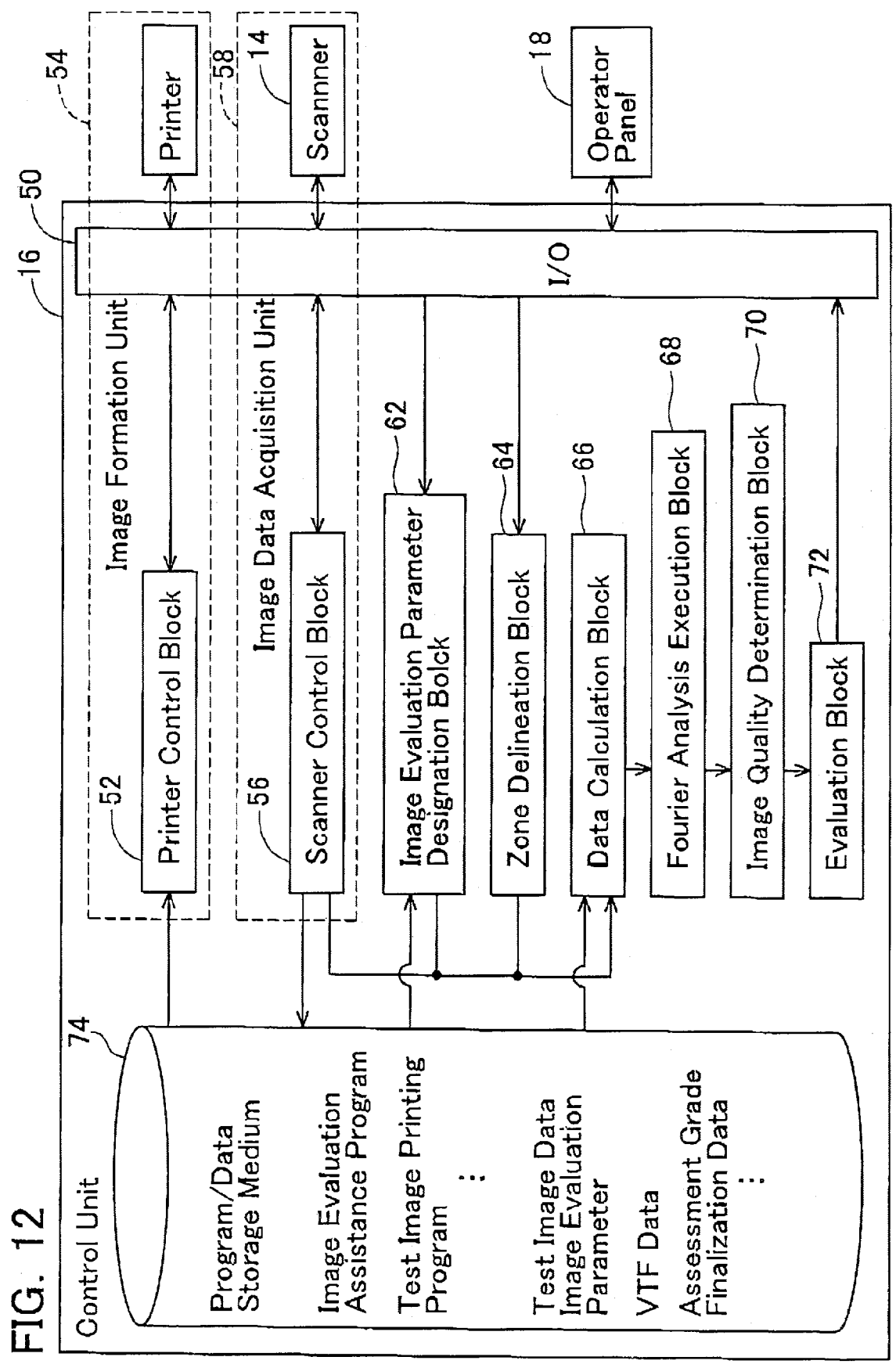
FIG. 12 is a block diagram showing functional blocks included in a control unit incorporated in a printer shown in FIG. 11.

The block diagram of FIG. 12 shows the functional configuration of control unit 16 (centered on features to be engaged in image evaluation assistance). Control unit 16 includes input/output (I/O) interface 50. Printer 12, scanner 14, and operator panel 18 are connected to control unit via I/O port 50.

Control unit 16 includes printer control block 52 as a functional block that controls printer 12. Printer control block 52 mekes printer 12 to print various images. Namely, printer 12 and printer control block 52 constitutes image formation unit 54. Image formation unit 54 performs printing of a test image that will be described later.

Moreover, control unit 16 includes scanner control block 56 as a functional block that controls scanner 14. Scanner control block 56 makes scanner 14 to read image data. Namely, scanner 14 and scanner control block 56 constitute image data acquisition unit 58. Image data acquisition unit 58 executes reading of image data, which represents a test images during image evaluation assistance.

Moreover, control unit 16 includes program/data storage medium 74 and a plurality of functional blocks 62 to 72 that executes respective pieces of processing included in image evaluation assistance. Various programs including an image evaluation assistance program and a test image printing program which will be described later, data items that are employed in the image evaluation assistance and that include test image data, an image evaluation parameter, VTF data, and assessment grade finalization data are saved in program/data storage medium 74.

Parameter designation block 62 is a functional block that designates an image evaluation parameter (that includes, size $S_{UA}$ of zone UA and pitch p of sampling points SP) on the basis of information on an image received from operator panel 18.

Zone delineation block 64 is, a functional block that delineates zones UA in image data and disposes sampling points SP therein.

Data calculation block 66 is a functional block that calculates data indicating the position of each of disposed sampling points SP and the optical characteristic value detected at each of the points.

Fourier analysis execution block 68 is a functional block that executes a Fourier analysis on each of zones UA.

Image quality determination block 70 is a functional block that determines the image qualities of respective zones UA according to the results of Fourier analysis.

Evaluation block 72 is a functional block that evaluates the quality of a test image according to the image qualities of respective zones UA.

Functional blocks 62 to 72 execute image evaluation assistance for image data acquired by image data acquisition unit 58.

(c) Test Image

A test image is an image used to evaluate the image forming ability of printing device 10 and a precision offered by printing device 10, or more particularly, an image used to evaluate the ability of printer 12 concerning a banding phenomenon. The banding phenomenon is a band-like defect occurring in an image. For example, the banding phenomenon is attributable to the unstableness in positions to which ink drops are jetted or in amounts of jetted inks which is caused by the movement of printing head 20 included in printer 12 or the feeding of a sheet of paper 24. In other words, the banding phenomenon is derived from a cyclic variation in an optical characteristic of an image occurring in one direction. For detection of the banding phenomenon, the test image is a monochrome image printed substantially on an entire sheet of A4 paper 24 in a relatively light color. In the present embodiment, the test image is a monochrome dark gray image. Specifically, the color of gray has a gray level of 128 on the assumption that black is level 0 and white is level 255. The test image is produced by shooting black ink to dot locations that are dispersed uniformly and that occupy a predetermined ratio to all densely arranged dot locations at which printer 12 can print a dot.

Printing of a test image is achieved by running a test image printing program. After a sheet of A4 paper 24 is mounted in printer 12, when a user performs predetermined manipulations on operator panel 18, control unit 16 starts the test image printing program. During processing implemented by the program, printer control block 52 first reads test image data from program/data storage medium 74. Thereafter, printer 12 is controlled based on the data. Owing to the processing, a test image is printed on the sheet of paper 24.

(d) Image Evaluation Assistance

For evaluation of the quality of a test image, image data representing the test image is read using scanner 14. A series of processes to be followed for the evaluation is executed by running an image evaluation assistance program stored in data storage medium 74. The flowchart of FIG. 13 describes the processes included in the program. The series of processes to be followed for the image evaluation will be described one by one in association with the steps, that is, the processes of the program described in the flowchart.

(1) Image Data Acquisition Process (Image Data Acquisition Step)

The present process is achieved by executing an image data acquisition step of step S1. After a sheet of paper 24 on which a test image is printed is mounted on scanner 14, when a us performs predetermined manipulations on operator panel 18, the present step is started. When the predetermined manipulations are performed on operator panel 18, scanner control block 56 controls scanner 14 and image data representing the test image is read. At this time, a resolution offered by scanner 14 is set to a maximum resolution. Consequently, scanner 14 reads the image data of the test image at the maximum resolution.

To be more specific, scanner 14 reads luminance data (particularly, red, green, and blue luminance data items) from each readable pixel (unit pixel UE). Scanner 14 reads data representing both the position of each unit pixel UE (x- and y-coordinates (x,y) in a coordinate system that has coordinate axes in the X and Y directions shown in FIG. 11) and a luminance value exhibited by each unit pixel UE. Thereafter, the luminance data of each unit pixel UE is converted into lightness data L defined in a L*a*b* color system (an optical characteristic value). Lightness data L is stored in program/data storage medium 74 in the form of L(x,y) associated with data (x,y) representing the position of unit pixel UB. At the present step, the image data acquisition unit 58 reads image data representing a test image.

(2) Parameter Designation Process (Parameter Designation Step)

The present process is achieved by executing a parameter determination step of step S2. At the present step, an image evaluation parameter needed to execute Fourier analysis is designated based on information on the size of spot of observation AR. As the image evaluation parameter, size $S_{UA}$ of zone UA and pitch p of sampling points SP are designated. The present process is achieved when control unit 16 serves as parameter designation block 62.

At the present step, first, a message prompting entry of information on the size of spot of observation AR in an image to be evaluated appears on the display included in operator panel 18. When a user manipulates operator panel 18 in response to the message, information on the size of spot of observation AR is transferred to control unit 16. Specifically, a user manipulates operator panel 18 so as to enter one of a viewing distance lw of an image to be evaluated and image size $S_{OIm}$ (the user selects one of them). More specifically, one of 50 cm, 30 cm, and 20 cm is selected as viewing distance lw. Likewise, one of A4, B5, Postcard, and Photo (size L or E) is selected as image size $S_{OIm}$. Moreover, the user enters the type of image to be evaluated. The image type is selected from two types of Text and Photo. The image evaluation parameter is designated based on these pieces of information on spot of observation AR.

Incidentally, a test image itself is not an image to be viewed by human beings. Therefore, the information on the size of spot of observation AR does not signify a viewing distance of the test image itself but signifies a viewing distance of an image to be printed later by the printing device 10. For image evaluation assistance, the quality of a virtual image to be printed in the future by printing device 10 is evaluated. Consequently, at the present step, information on spot of observation AR in the virtual image is entered.

On the other hand, four image evaluation parameters Mode($\alpha$) (where $\alpha$ denotes 1, 2, 3, or 4) each composed of size $S_{UA}$ and pitch p are stored in program/data storage medium 74. Specifically, each of the four image evaluation parameters is data specifying [Mode($\alpha$): $S_{UA}(\alpha)$, p($\alpha$)]. Herein, $S_{UA}$ denotes the size of zone UA, and four $S_{UA}$ values shall have the relationship of $S_{UA}(1)<S_{UA}(2)<S_{UA}(3)<S_{UA}(4)$. Moreover, p($\alpha$) denotes a pitch of sampling point four p($\alpha$) values shall have the relationship of p(1)<p(2)<p(3)<p(4). Thus, the image evaluation parameter is optimized for evaluation of an image having spot of observation AR that gets larger along with an increase in $\alpha$.

Figure 14:
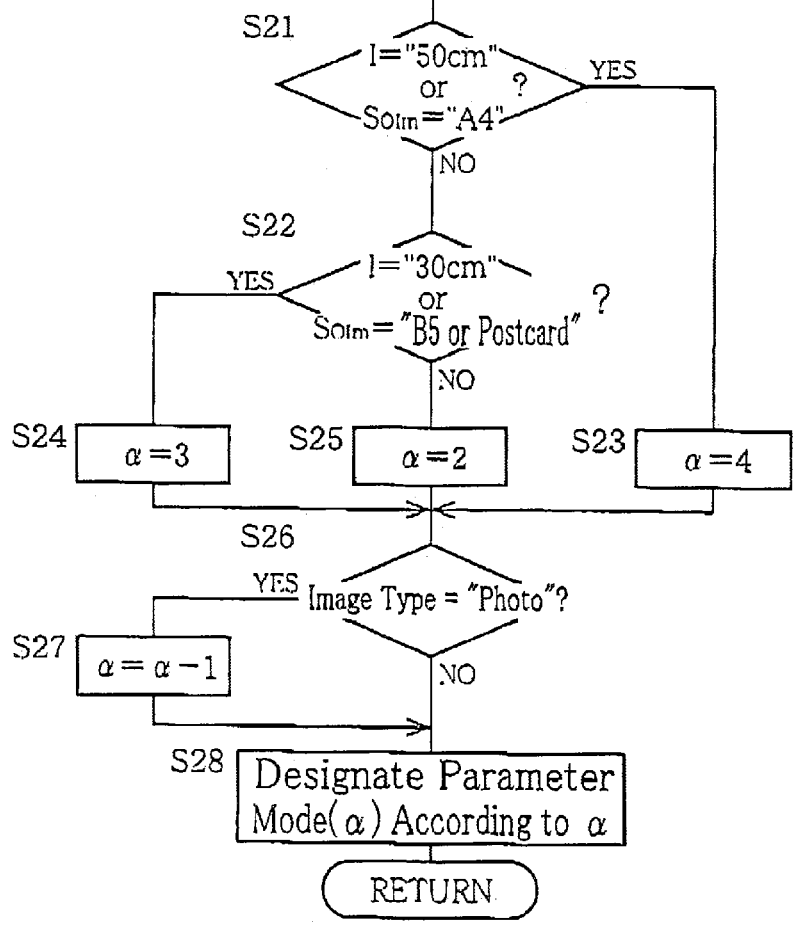
FIG. 14(a) is an explanatory diagram concerning parameters stored in a memory.
FIG. 14(b) is a flowchart describing a subroutine to be run in order to designate an image evaluation parameter.

An image evaluation parameter is determined by running a subroutine described in the flowchart of FIG. 14(b). As described in FIG. 14(b), an argument $\alpha$ is designated by selecting any of values, which range from 4 to 2, according to viewing distance lw or image size $S_{OIm}$ at steps S21 to S25. Furthermore, when an image type is set to Photo, spot of observation AR is presumably smaller. The argument $\alpha$ is therefore decremented by one (steps S26 and S27). Based on the thus determined argument $\alpha$, one image evaluation parameter [Mode($\alpha$): $S_{UA}(\alpha)$, p($\alpha$)] is read from program/data storage medium 74 (step S28). Thus, argument $\alpha$ is determined based on information on the size of spot of observation AR (specifically, viewing distance lw, image size $S_{UA}$, and an image type). An image evaluation parameter is designated based on argument $\alpha$. Consequently, an optimal image evaluation parameter is designated according to spot of observation AR.

(3) Zone Delineation Process (Zone Delineation Step)

Figure 13:
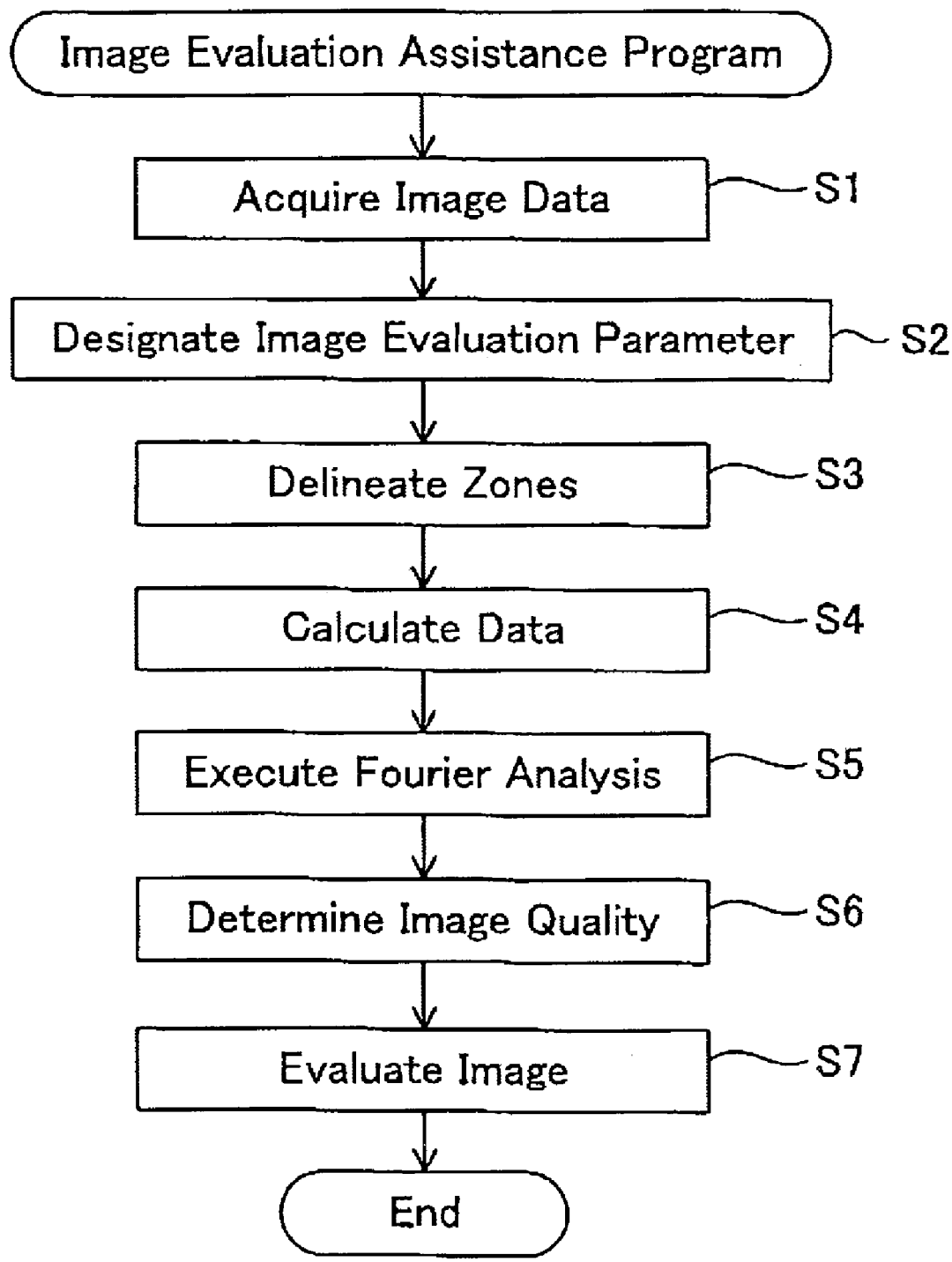
FIG. 13 is a flowchart describing an image evaluation assistance program that is run by the control unit incorporated in the printer.

The present process is achieved by executing a zone delineation step of step S3 described in FIG. 13. At the present step, an entire test image is regarded as an evaluative domain. Based on the image evaluation parameter read at step S2, the evaluative domain is divided into zones UA. Sampling points SP are disposed in each of zones UA on the basis of the image evaluation parameter read at step S2. The present step is executed when control unit 16 serves as zone delineation block 64.

Delineation of zones UA is achieved by dividing an evaluative domain of A4 size (namely, an entire test image) by size $S_{UA}(\alpha)$ of zone UA in the X and Y directions. Consequently, zones UA having size $S_{UA}(\alpha)$ are defined in the form of a matrix in the test image (see FIG. 5). As mentioned above, each of zones UA is expressed as UA(x,y) using x- and y-coordinates.

Sampling points SP are disposed in each zone UA at pitch p($\alpha$) in the X direction and Y direction alike. Namely, sampling points SP are, as shown in FIG. 4, disposed in the form of a matrix. Each of sampling points SP is expressed as SP(s,y) in association with a position represented by x- and y-coordinates in a coordinate system defined for each zone UA.

(4) Data Calculation Process (Data Calculation Step)

The present process is achieved by executing a data calculation step of step S4 described in FIG. 13. At the present step, data representing both the position and optical characteristic value of each of disposed sampling points SP is calculated in units of zone UA. Specifically, lightness value L to be exhibited at the position of each sampling point SP is calculated based on image data representing a test image and being read at step S1. The present step is executed when control unit 16 serves as data calculation block 66.

Figure 15:
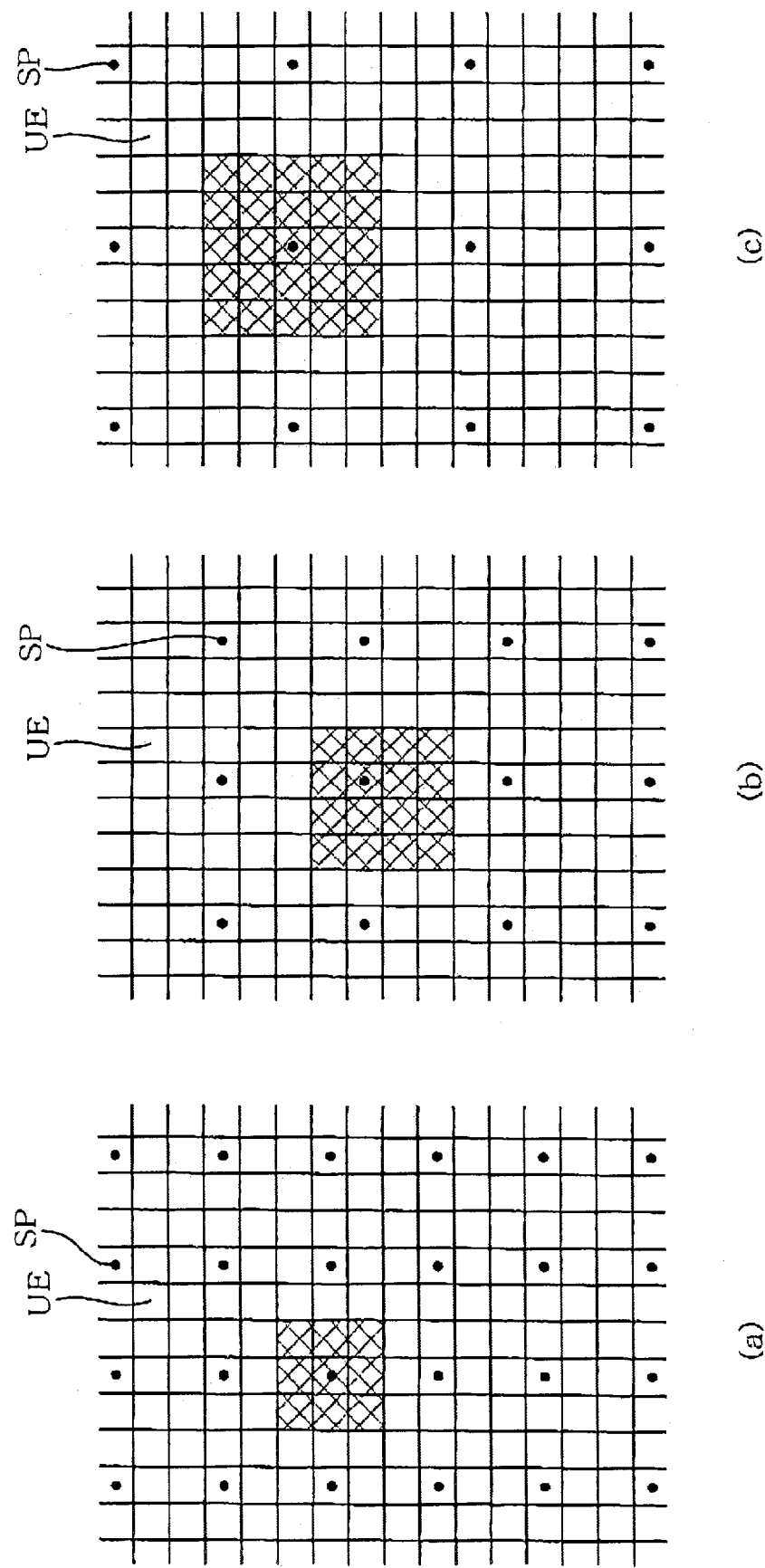
FIG. 15(a), FIG. 15(b), and, FIG. 15(c) are explanatory diagrams concerning a method for detecting optical characteristic values of respective sampling points using data of an image.

Referring to the illustrative diagram of FIG. 15, a description will be made more particularly. Unit pixels UE in image data are disposed in the form of a matrix as if they were segments of a test image. As mentioned above, lightness value L exhibited by each unit pixel UX has been acquired at step S1. Moreover, sampling points SP have been disposed at pitch p($\alpha$) in each zone UA.

In the data calculation process, unit pixel UE containing a sampling point SP and unit pixels UE surrounding unit pixel UE are selected. Unit pixels UE to be selected are determined based on pitch p($\alpha$) of sampling points SP For example, assuming that sampling points SP are disposed as shown in FIG. 15(a) (pitch p(2)), nine unit pixels UE including unit pixel UE that contains sampling point SP and neighboring unit pixels are selected. When pitch p is as large as the one shown in FIG. 15(b) or FIG. 15(c) (pitch p(3) or pitch p(4)), a larger number of unit pixels UE such as sixteen unit pixels or twenty-five unit pixels is selected. Moreover, when pitch p($\alpha$) is small (pitch p(1)), four unit pixels UE surrounding sampling point SP are selected.

After unit pixels UE associated with sampling point SP are selected, a mean of lightness values L exhibited by selected unit pixels UB is calculated. Lightness value L' associated with sampling point SP is thus calculated.

As mentioned above, in the present process, data items that represent lightness values L' of all disposed sampling points SP respectively are calculated. Each of the calculated lightness data items L' is expressed as L'(x,y) in relation to position (x,y) of each sampling point SP.

(5) Fourier Analysis Execution Process (Fourier Analysis Execution Step)

The present process is achieved by executing a Fourier analysis execution step of step S5 described in FIG. 13. At the present step, one-dimensional Fourier transform is executed based on lightness data items L' of respective sampling points SP. The one-dimensional Fourier transform is executed in units of zone LA. Moreover, the one-dimensional Fourier transform is executed in each of the X and Y directions in each zone UA. When the one-dimensional Fourier transform is executed for each zone UA, a power spectrum is calculated relative to each of the X and Y directions in each zone UA. The present step is executed when control unit 16 serves as Fourier analysis execution block 68.

Fourier analysis executed at step S5 will be described below. Fourier analysis to be performed on respective zones UA is the same processing. Moreover, processing to be performed in the X direction is identical to processing to be performed in the Y direction. Herein, only the processing to be performed in the X direction in one zone UA will be described below.

To begin with, lightness data items L' of respective sampling points SP are compressed. Specifically, a mean of lightness data items L' associated with the same x-coordinate out of all the lightness data items L'(x,y) is calculated. Thus, one-dimensional lightness data items L'(x) associated with respective x-coordinates are worked out. Thereafter, one-dimensional Fourier transform is performed based on one-dimensional data items L'(x). The one-dimensional Fourier transform provides a power spectrum (spatial frequency characteristic function Fx(u)) of noises detected in the X direction. The one-dimensional Fourier transform is achieved according to the following expression:

$$Fx(u) = \sum_{x=0}^{M-1} L'(x) * \exp\left(\frac{-2\pi jxu}{M}\right)$$

In the above expression, M denotes the number of sampling points SP juxtaposed in the X direction within zone UA.

A calculated power spectrum is, for example, like the one shown in FIG. 2, though it varies depending on a situation in which noises occur (in this case, the axis of abscissas reads a spatial frequency u, and the axis of ordinates reads the function Fx(u).)

The same technique as the foregoing one is used to calculate a power spectrum Fy(u) relevant to the Y direction. Thus, power spectra relevant to the X and Y directions of all zones UA are calculated, and the present step is completed.

(6) Image Quality Determination Process (Image Quality Determination Step)

The present process is achieved by executing an image quality determination step of step S6 described in FIG. 13. At the present step, the image quality of each zone UA is evaluated. In other words, an assessment index value indicating the degree of a banding phenomenon occurring in each zone UA is determined. The present step is executed when control unit 16 serves as image quality determination block 70.

To be more specific, a luminous efficiency filter is applied to the power spectra relevant to the X and Y directions of each zone UA. Specifically, the power spectra Fx(u) and Fy(u) are multiplied by a visual trait correction function VTF(u) stored as VTF data in program/data storage medium 74. This results in corrected spatial frequency characteristic functions Fx'(u) and Fy'(u) that have been corrected in consideration of the luminous efficiency.

$$Fx'(u)=VTF(u)*Fx(u)$$

$$Fy'(u)=VTF(u)*Fy(u)$$

Incidentally, the visual trait correction function VTF(u) is plotted as a characteristic curve shown in FIG. 7 (wherein, the axis of abscissas in FIG. 7 reads the spatial frequency u). Thereafter, the peak values (highest values) $Pe_x$ and $Pe_y$ of the corrected spatial frequency characteristic functions Fx'(u) and Fy'(u) are adopted as assessment index values of each zone UA. The aforesaid filtering and assessment index value determination are executed for each zone UA. Thus, assessment index values $Pe_x$ and $Pe_y$ of all zones UA are obtained.

(7) Evaluation Process (Evaluation Step)

The present process is achieved by executing an evaluation step of step S7 described in FIG. 13. At the present step, the quality of a test image is evaluated based on the assessment index values of each zone UA. The present step is executed when control unit 16 serves as evaluation block 72.

Specifically, the largest one of the assessment index values $Pe_x$ and $Pe_y$ of all zones UA is regarded as poorest value MB. Poorest value MB is compared with assessment grade finalization data stored in program/data storage medium 74. Consequently, assessment grade G of the test image is determined. Determined assessment grade G is displayed on the display of operator panel 18 and thus notified a user.

Thus, the image evaluation assistance program is terminated and image evaluation assistance is terminated.

As described so far, in the method of evaluating the quality of an image according to the first embodiment, an image evaluation parameter is designated based on information on the size of a spot of observation in an image that will be printed by the printer. Consequently, the image evaluation parameter is designated based on whether noises are readily discernible when an image is viewed. Specifically, when the spot of observation in the image is small, microscopic noises and high-frequency noises are highly precisely detected. In contrast, when the spot of observation in the image is large, low-frequency noises are highly precisely detected. Namely, image evaluation can be performed with a detecting precision required for the purpose of use of an image. Moreover, since detection of noises is not performed with an unnecessarily high precision, the time required for image evaluation can be shortened.

Moreover, in the method of evaluating the quality of an image according to the present embodiment, a distance of an image from an observer, the size of the image, and the type of image are adopted as pieces of information on the size of a spot of observation in an image. This makes it possible to more accurately describe the spot of observation. Eventually, image evaluation can be achieved more preferably.

Moreover, in the method of evaluating the quality of an image according to the present embodiment, an entire image is regarded as an evaluative domain, and the evaluative domain is divided into zones UA. The quality of the image is evaluated based on the poorest assessment index value among the assessment index values of the respective zones UA. Consequently, image evaluation can be achieved in a manner similar to that performed by a human sense.

Moreover, in the method of evaluating the quality of an image according to the present embodiment, a calculated power spectrum is corrected using a visual trait correction function based on a human sense. Thus, image evaluation can be achieved similarly to that performed by the human sense.

Moreover, the image evaluation device in accordance with the first embodiment can evaluate a test image printed by the printer. Consequently, the performance of the printer or an abnormality thereof (uncertainty in an amount of ink jetted from the printing head, a displacement of a position to which ink is jetted, clogging, or the like) can be detected.

Moreover, in the first embodiment, a grayish monochrome test image is evaluated. Various test images can be printed and evaluated according to the type of noises to be detected.

In the aforesaid embodiment, image data representing a printed image is acquired using the scanner, and lightness data items of respective sampling points are acquired from the image data. The present invention is not limited to this mode. For example, a spectrophotometer or a colorimeter may be used to directly measure an optical characteristic value at sampling points. Moreover, optical characteristic values of respective sampling points may be calculated from image data produced by a digital camera or image data produced by a computer (that is, image data that is not printed) to evaluate the quality of the image data. When the quality of image data that is not printed is evaluated, a precision in image pickup performed by a digital camera or the ability of software to form an image can be evaluated.

Moreover, in the aforesaid embodiment, Fourier analysis is performed based on lightness data into which luminance data sampled from image data acquired by the scanner is converted. Alternatively, Fourier analysis may be performed based on any other optical characteristic value such as a hue, lightness, or saturation value. For example, parameters defined in the Munsell color system, L*a*b* color system, L*C*h color system, Hunter Lab color system, or XYZ (Yxy) color system, a color difference, or a luminance value defined in the tristimulus (X,Y,Z) or (R,G,B) system or monochrome system may be employed. Consequently, as long as the optical characteristic values can be detected, various images can be evaluated irrespective of whether they are colored or monochrome.

Moreover, in the aforesaid embodiment, the size of an evaluative unit zone and a pitch of sampling points are designated as conditions for image evaluation. Any other condition may be adopted. For example, the sum total of sampling points may be adopted. Otherwise, the shape of a zone UA or a distribution pattern of sampling points may be adopted.

In the first embodiment, the quality of an image is determined based on the poorest assessment index value among all assessment index values indicating the image qualities of respective zones UA. Alternatively, any other method may be adopted in order to determine the quality of an image. For example, a mean or a median of assessment index values of respective zones UA may be calculated, and the quality of an image may be determined based on the mean or median. Various statistical techniques may be adopted.

In the aforesaid embodiment, an entire image is regarded as an evaluative domain Alternatively, part of an image may be regarded as the evaluative domain according to a purpose. Moreover, zones UA may be discretely delineated within the evaluative domain.

Second Embodiment

Next, the second embodiment of the present invention will be described below. The second embodiment is an embodiment of a device for assisting in evaluating the quality of an image that is a device dedicated to image evaluation. This device for assisting in evaluating the quality of an image evaluates, unlike the printing device in accordance with the first embodiment, the quality of an image formed by any of various image forming devices. Specifically, not only the quality of a special image such as a test image but also the quality of a general image can be evaluated. The description of the present embodiment will be partly identical to the description of the first embodiment. The iterative description will be omitted or made briefly. Moreover, the same reference numerals will be assigned to components of the device for assisting in evaluating the quality of an image identical or similar to the components of the printing device in accordance with the first embodiment.

Figure 16:
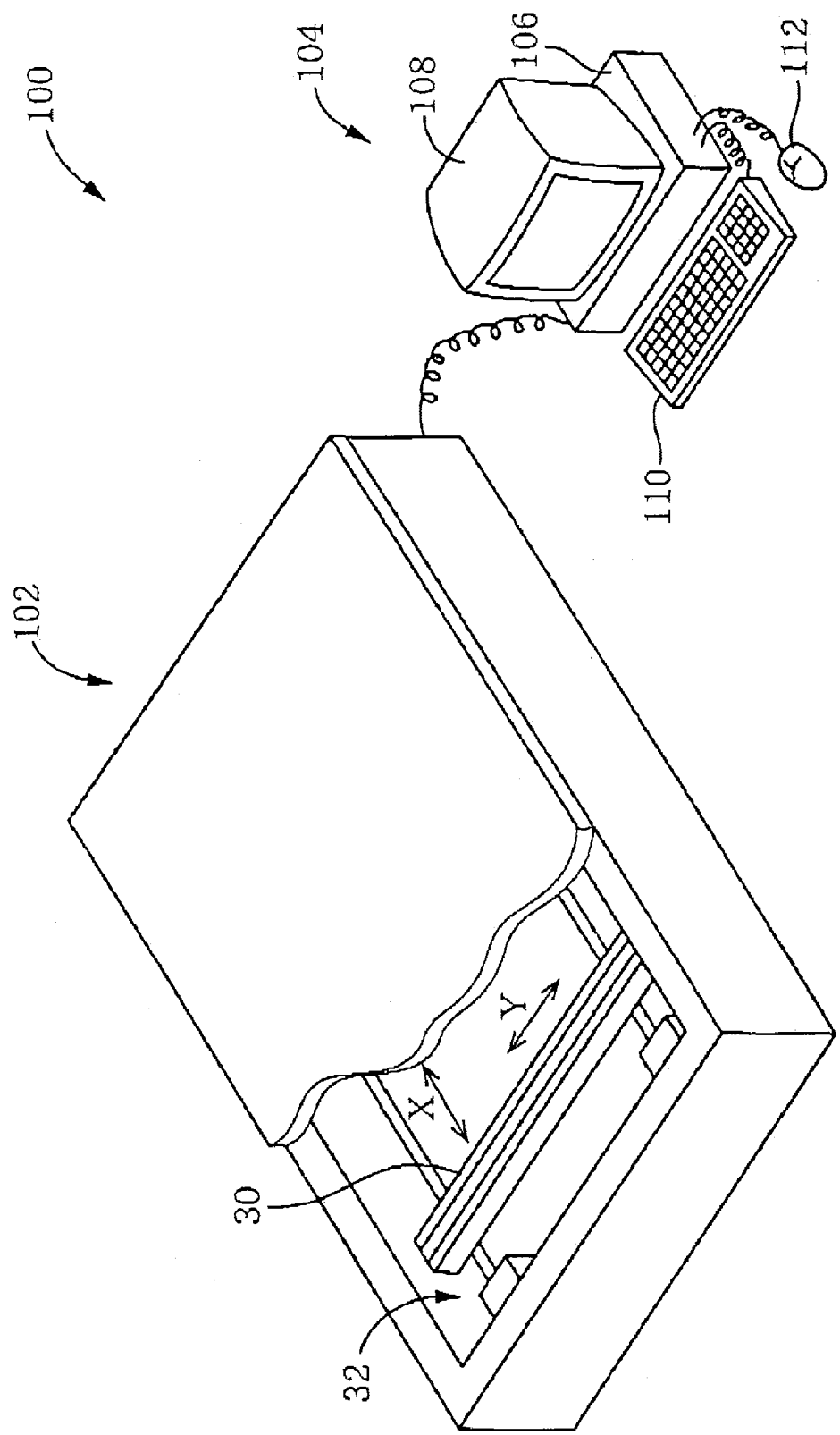
FIG. 16 is a perspective view of a device for assisting in evaluating the quality of an image in accordance with the second embodiment.

(a) Hardware Configuration of the Device for Assisting in Evaluating the Quality of an Image FIG. 16 is a perspective view of the entire device for assisting in evaluating the quality of an image. Device for assisting in evaluating the quality of an image 100 includes image scanner 102 and general-purpose computer system 104. Computer system 104 includes computer body 106, display 108 that is a display device, and keyboard 110 and mouse 112 that are input devices. Image scanner 102 is, similarly to scanner 14 included in printing device 10 in accordance with the first embodiment, of a flat-bed type. Image scanner 102 includes scanning head 30 and head mover 32. However, image scanner 102 is, unlike scanner 14, a large-size scanner capable of reading image data from a large image (for example, of an A1 size).

(b) Functional Configuration of the Computer Body

Figure 17:
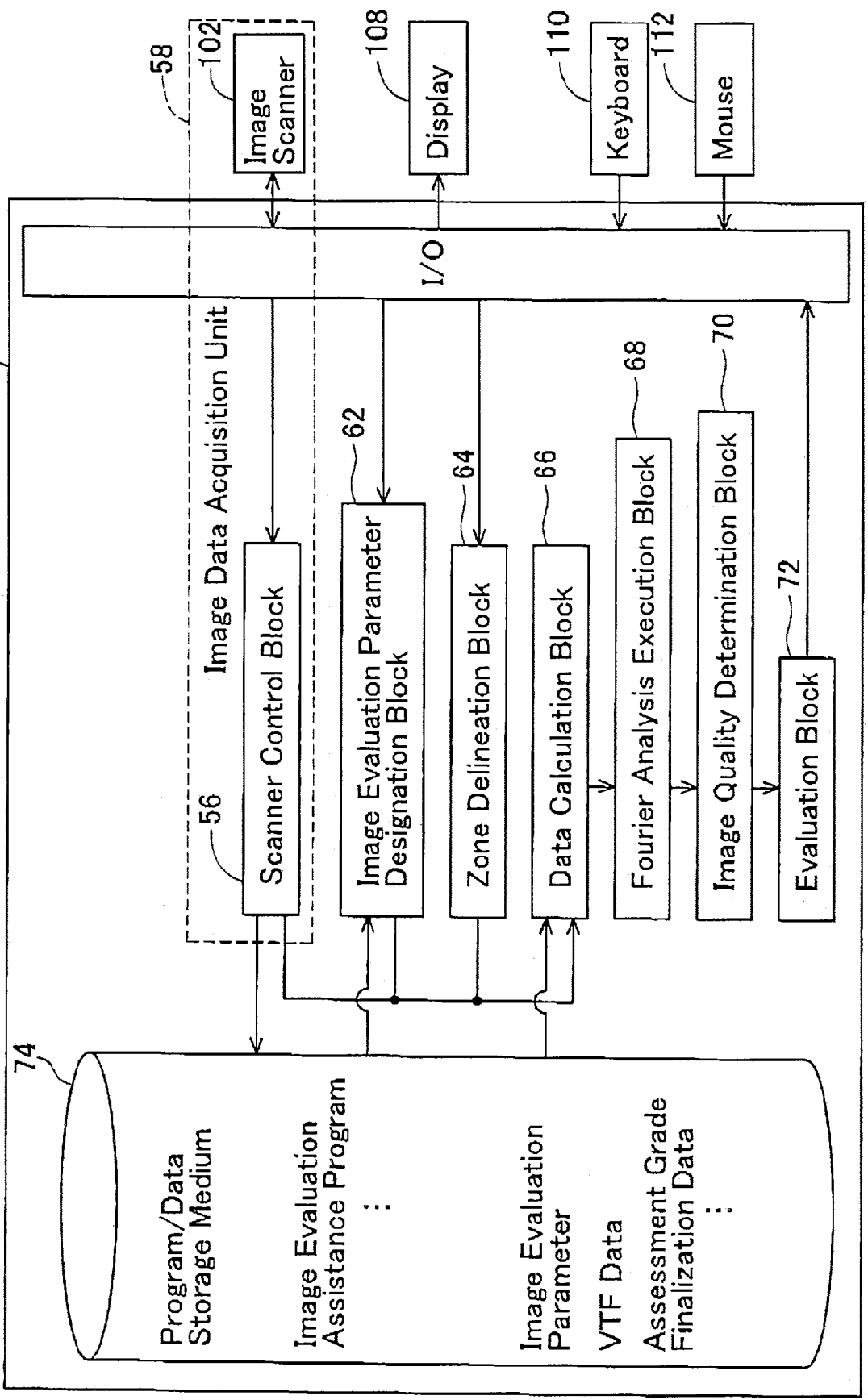
FIG. 17 is a block diagram showing functional blocks included in a computer incorporated in the device for assisting in evaluating the quality of an image which is shown in FIG. 16.

The functional configuration of computer body 106 is, as shown in FIG. 17, substantially identical to that of control unit 16 included in the first embodiment except the portion engaged in printing of an image. The functional blocks 58 to 74 are substantially identical to those included in the first embodiment, and an iterative description will be omitted.

(c) Object Image

Device for assisting in evaluating the quality of an image 100 can, as mentioned above, evaluate not only the quality of a spatial image such as a test image but also the quality of a general image. Hereinafter, a description will be made of image evaluation to be performed in a case where a general image is regarded as an object image, that is, an image to be evaluated. Incidentally, as far as the general image is concerned, when the general image alone is used, noises can hardly be identified through Fourier analysis. Consequently, in image evaluation assistance to be performed in the present embodiment, an image identical to the object image and hardly affected by noises is adopted as a reference image. The object image is evaluated through comparison with the reference image. In the first embodiment, a banding characteristic is adopted as an evaluative item. In the present embodiment, the granularity of an image is adopted as the evaluative item.

(d) Image Evaluation Assistance

In the present embodiment, image evaluation assistance is achieved when a predetermined image evaluation assistance program is run in computer system 104. The image evaluation assistance program is, similarly to the aforesaid program, a program including the steps described in the flowchart of FIG. 13. Hereinafter, similarly to the first embodiment, the processes, that is, steps of the programs will be sequentially described below.

(1) Image Data Acquisition Process (Image Data Acquisition Step)

In image data acquisition employed in the present embodiment, image data representing object image OIm that is an image to be evaluated and image data representing reference image RIm are acquired. First, reference image RIm is mounted on image scanner 102. A user manipulates keyboard 110 to acquire the image data of reference image RIm. Thereafter, object image OIm is mounted on image scanner 102, and the image data of object image OIm is acquired by manipulating keyboard 110 in the same manner. The contents of image data acquisition are identical to those of image data acquisition employed in the first embodiment. Moreover, the image data of reference image RIm and the image data of object image OIm are, similarly to those in the first embodiment, acquired in the form of lightness data items of respective unit pixels UE. The image data of reference image Rim and the image data of object image OIm are saved in the form of data $L_R(x,y)$ and data $L_O(x,y)$ respectively in program/data storage medium 74.

(2) Parameter Designation Process (Parameter Designation Step)

In condition-for-evaluation designation employed in the present embodiment, similarly to that employed in the first embodiment, an image evaluation parameter is designated based on information on spot of observation AR. As the image evaluation parameter, size $S_{UA}$ of zone UA and pitch p of sampling points SP disposed in zone UA are designated In the present embodiment, size $S_{OIm}$ of object image $O_{Im}$ (which is equal to size $S_{RIm}$ of reference image RIm and will therefore be referred to as image size $S_{IM}$) and viewing distance lw that is a distance of an image from an observer are adopted as pieces of information on the size of the spot of observation.

Size $S_{UA}$ of zone UA is determined based on image size $S_{Im}$. Pitch p of sampling points SP is determined based on viewing distance lw.

Image size $S_{Im}$ is calculated based on the number of unit pixels UE juxtaposed in the X direction in acquired image data, the number of unit pixels UE juxtaposed in the Y direction therein, and a resolution offered by image scanner 102 at the time of acquiring the image data. As image size $S_{Im}$, image size $S_{Im}$·x in the X direction and image size $S_{Im}$·y in the Y direction are calculated. As viewing direction lw, a value which a user enters at keyboard 110 is adopted.

A description will be made of a method of determining size $S_{UA}$ of zone UA and pitch p of sampling points SP. Device for assisting in evaluating the quality of an image 100 in accordance with the present embodiment determines size $S_{UA}$ and pitch p by performing predetermined arithmetic operations. Specifically, size $S_{UA}$ of zone UA is calculated according to the following expression:

$$S_{UA} = \{(S_{Im} \cdot x + S_{Im} \cdot y)/2\} * A$$

Herein, A denotes a constant (saved as zone data in program/data storage medium 74).

Moreover, pitch p of sampling points SP is, as provided by the expression below, calculated as a product of entered viewing distance lw by a constant B (saved as zone data in program/data storage medium 74).

$$p = lw * B$$

As seen from the above two expressions, the larger the image size $S_{Im}$ is, the larger the size $S_{UA}$ of zone UA is. Moreover, the longer the viewing distance lw is, the larger the pitch p of sampling points SP is. Consequently, in parameter designation, when a spot of observation is larger, both size $S_{UA}$ and pitch p are set to larger values. In other words, a preferable image evaluation parameter is designated based on the spot of observation in an object image.

(3) Zone Delineation Process (Zone Delineation Step)

In zone delineation employed in the present embodiment, a technique identical to the one adopted in the first embodiment is used to delineate zones UA and dispose sampling points SP. Moreover, zones UA and sampling points SP are delineated or disposed in both reference image RIm and object image OIm. Zones UA delineated in reference image RIm and object image OIm and sampling points SP disposed therein are expressed in the form of zones UA(x,y) and points SP(x,y) respectively.

(4) Data Calculation Process (Data Calculation Step)

In data calculation employed in the present embodiment, a technique identical to the one adopted in the first embodiment is applied to both reference image RIm and object image OIm. Specifically, lightness data L' at each sampling point SP is calculated in units of zone UA. Calculated lightness data items L' are expressed as data items $L_R'(x,y)$ and data items $L_O'(x,y)$ respectively.

In device for assisting in evaluating the quality of an image 100 in accordance with the present embodiment, the number of unit pixels UE selected relative to one sampling point SP is automatically determined based on pitch p of sampling points SP. Specifically, when pitch p of sampling points SP is small, a small number of unit pixels UE is selected. Assuming that the pitch p is very small, if a sampling point SP is disposed in every unit pixel UE, the number of selected unit pixels UE is one. As the pitch p gets larger, the number of selected unit pixels UE increases to be one, four, nine, sixteen, twenty-five, etc. (see FIG. 15).

(5) Fourier Analysis Execution Process (Fourier Analysis Execution Step)

In Fourier analysis employed in the present embodiment, a Wiener spectrum of each zone UA is calculated in order to evaluate a granularity. In the present process, a two-dimensional Wiener spectrum is calculated for each of the reference image RIm and object image OIm. Moreover, a two-dimensional Wiener spectrum indicating noises contained in the object image OIm is calculated from a difference between the two-dimensional Wiener spectra of the reference image RIm and object image OIm respectively. Furthermore, a one-dimensional Wiener spectrum is calculated from the two-dimensional Wiener spectrum indicating noises contained in the object image OIm.

Calculation of the one-dimensional Wiener spectrum is performed in units of a zone UA. Arithmetic operations to be performed for respective zones UA are the same among the zones. Therefore, calculation of the one-dimensional Wiener spectrum of one zone UA will be described below.

First, lightness data items $L_R'(x,y)$ (or lightness data items $L_O'(x,y)$ acquired from object image OIm) are two-dimensional-Fourier-transformed to calculate two-dimensional spatial frequency characteristic function $F_R(u,v)$ (or function $F_O(u,v)$ for object image OIm). The two-dimensional Fourier transform is performed according to the following expressions:

$$F_R(u, v) = \sum_{x=0}^{M-1} \sum_{y=0}^{N-1} L_R'(x, y) * \exp\left(\frac{-2\pi jxu}{M}\right) * \exp\left(\frac{-2\pi jyv}{N}\right)$$

-continued $$F_O(u,v) = \sum_{x=0}^{M-1}\sum_{y=0}^{N-1} L'_O(x,y) * \exp\left(\frac{-2\pi jxu}{M}\right) * \exp\left(\frac{-2\pi jyv}{N}\right)$$

In the above expressions, u and v denote a spatial frequency, and M and N denote the number of sampling points SP juxtaposed in the X or Y direction in zone UA.

Thereafter, two-dimensional Wiener spectrum $P_R(u,v)$ (or spectrum $P_O(u,v)$) is calculated from two-dimensional spatial frequency characteristic function $F_R(u,v)$ relevant to each zone UA (or function $F_O(u,v)$ for object image OIm). Calculation of the two-dimensional Wiener spectrum is performed according to the following expressions:

$$P_R(u,v) = |F_R(u,v)|^2$$

$$P_O(u,v) = |F_O(u,v)|^2$$

Thereafter, two-dimensional Wiener spectrum P(u,v) indicating noises contained in object image OIm is calculated according to the following expression:

$$P(u,v) = P_O(u,v) - P_R(u,v)$$

Polar coordinate conversion is performed on two-dimensional Wiener spectrum P(u,v) to obtain polar coordinate system Wiener spectrum $P(f_r,\theta)$. Thereafter, one-dimensional Wiener spectrum $P(f_r)$ is calculated from the polar coordinate system Wiener spectrum $P(f_r,\theta)$ according to the following expression:

$$P(f_r) = \sum_{i=1}^{n} P(f_r, i\Delta\theta) * \Delta\theta \quad (n = 180)$$

where $f_r$ denotes a spatial frequency, and n denotes an integral range in an angular direction that is normally 180° or a half circumference. Moreover, $\Delta\theta$ denotes a standard divisional angle (=Π/n) defined in the polar coordinate system.

The one-dimensional Wiener spectrum $P(f_r)$ resulting from the series of arithmetic operations expresses an integral of energy exhibiting the same spatial frequency in a donut-shaped domain centered on an origin of a Wiener spectrum space. The series of arithmetic operations is performed on all zones UA constituting object image OIm, whereby Fourier analysis is completed.

(6) Image Quality Determination Process (Image Quality Determination Step)

In image quality determination, the image qualities of respective zones UA constituting object image OIm are evaluated. Namely, granularity assessment index value GS is calculated for each zone UA.

Specifically, a visual trait correction function $VTF(j*\Delta f_r)$ saved as VTF data is read from program/data storage medium 74. Granularity assessment index value GS relevant to each zone US is calculated based on one-dimensional Wiener spectrum $P(f_r)$ of each zone UA and visual trait correction function $VTF(j*\Delta f_r)$. Granularity assessment index value GS is calculated according to the following expression:

$$GS = c * \left\{\sum_{i=1}^{m} \sqrt{P(j*\Delta f_r)} * VTF(j*\Delta f_r)\right\} * \Delta f_r,$$

where $\Delta f_r$ denotes a standard spatial frequency, c denotes a constant, and m denotes a half of the number of sampling points SP juxtaposed in the X and Y directions in a zone UA.

(7) Evaluation Process (Evaluation Step)

In evaluation, similarly to that employed in the first embodiment, the quality of object image OIm is evaluated. Specifically, the largest one of granularity assessment index values GS relevant to respective zones UA is calculated as poorest value MB. Thereafter, poorest value MIB is compared with a plurality of assessment grade finalization data items stored in program/data storage medium 74. Consequently, assessment grade G of object image OIm is acknowledged. The acknowledged assessment grade G is displayed on display 108 and thus notified a user.

As described so far, according to the method of evaluating the quality of an image of the second embodiment, the quality of an object image is evaluated by comparing the object image with a reference image. Consequently, any general image can be evaluated. Moreover, an image evaluation parameter is designated based on the size of the object image and a viewing distance. Consequently, image evaluation can be achieved at a precision dependent on whether a defect in an image is readily discernible when the image is viewed.

What is claimed is:

1. A method of evaluating the quality of an image comprising at least one zone, wherein the method comprises the steps of:
    determining at least one of a parameter associated with at least one zone and a parameter associated with a distribution pattern of sampling points within the at least one zone, wherein the at least one parameter is determined based on at least one of the following:
        (1) a distance between an observer and the image,
        (2) a size of the image, and
        (3) a type of the image;
    delineating the at least one zone in the image,
        wherein the at least one zone is delineated based on the determined at least one parameter when the determined parameter is associated with the at least one zone, and
        wherein the at least one zone is delineated based on a predetermined parameter when the determined parameter is not associated with the at least one zone;
    disposing the sampling points within the at least one zone,
        wherein the sampling points are disposed based on the determined at least one parameter when the determined parameter is associated with the distribution pattern, and
        wherein the sampling points are disposed based on a predetermined parameter when the determined parameter is not associated with the distribution pattern;
    identifying data that indicates a position and an optical characteristic value of each of the sampling points within the at least one zone which are determined based at least on the at least one parameter;

performing Fourier analysis on the data relevant to the at least one zone to obtain an image quality of the at least one zone; and determining the quality of the image based on the image quality of the at least one zone.

2. The method of claim 1, wherein the at least one parameter is determined based at least on information associated with a size of a spot of observation in the image, wherein the size of the spot of observation is determined based on one of the following:

(1) the distance between the observer and the image, (2) the size of the image, and (3) the type of the image.

3. The method of claim 1, wherein the step of determining the at least one parameter further comprises determining at least a size of the at least one zone.

4. The method of claim 1, wherein the step of determining the at least one parameter further comprises determining at least a distance between adjacent sampling points.

5. The method of claim 1, wherein the step of determining the at least one parameter further comprises determining at least a size of the at least one zone and a distance between adjacent sampling points.

6. The method of claim 2, wherein:

in the step of determining the at least one parameter, as the size of the spot of observation increases the size of the at least one zone also increases.

7. The method of claim 2, wherein:

in the step of determining the at least one parameter, as the size of the spot of observation increases the distance between adjacent sampling points also increases.

8. The method of claim 1, wherein the at least one zone comprises a plurality of zones, and in the step of delineating, the plurality of zones are delineated, so that every point within the image is included within one zone of the plurality of zones.

9. The method of claim 8, wherein the step of performing Fourier analysis further comprises obtaining the image quality of each zone of the plurality of zones, and the step of determining the quality of the image further comprises determining the quality of the image based on the zone of the plurality of zones having the lowest image quality.

10. A device for assisting in evaluating the quality of an image comprising at least one zone, the device comprising:

means for determining at least one of a parameter associated with the at least one zone and a parameter associated with a distribution pattern of sampling points within the at least one zone, wherein the at least one parameter is determined based at least one of the following:

(1) a distance between an observer and the image, (2) a size of the image, and (3) a type of the image;

means for delineating the at least one zone in the image, wherein the at least one zone is delineated based on the determined at least one parameter when the determined parameter is associated with the at least one zone, and wherein the at least one zone is delineated based on a predetermined parameter when the determined parameter is not associated with the at least one zone;

means for disposing the sampling points within the at least one zone, wherein the sampling points are disposed based on the determined at least one parameter when the determined parameter is associated with the distribution pattern, and wherein the sampling points are disposed based on a predetermined parameter when the determined parameter is not associated with the distribution pattern;

means for identifying data that indicates a position and an optical characteristic value of each of the sampling points within the at least one zone which are determined based on the at least one parameter;

means for performing Fourier analysis on the data relevant to the at least one zone to obtain an image quality of the at least one zone; and means for determining the quality of the image based on the image quality of the at least one zone.

11. An image forming device, comprising:

means for forming an image comprising at least one zone;

means for determining at least one of a parameter associated with the at least one zone and a parameter associated with a distribution pattern of sampling points within the at least one zone, wherein the at least one parameter is determined based on at least one of the following:

(1) a distance between an observer and the image, (2) a size of the image, and (3) a type of the image;

means for delineating the at least one zone in the image, wherein the at least one zone is delineated based on the determined at least one parameter when the determined parameter is associated with the at least one zone, and wherein the at least one zone is delineated based on a predetermined parameter when the determined parameter is not associated with the at least one zone;

means for disposing the sampling points within the at least one zone, wherein the sampling points are disposed based on the determined at least one parameter when the determined parameter is associated with the distribution pattern, and wherein the sampling points are disposed based on a predetermined parameter when the determined parameter is not associated with the distribution pattern;

means for measuring an optical characteristic value of the image at least at each of the sampling points within the at least one zone which are determined based on the determined parameter;

means for performing Fourier analysis on the optical characteristic values of the sampling points within the at least one zone to obtain an image quality of the at least one zone; and means for determining a quality of the image based on the image quality of the at least one zone.

12. A computer program product that includes a computer-readable medium having computer-readable instructions stored thereon for execution by a processor, wherein execution of the computer-readable instructions causes said computer program product to perform the steps of:

determining at least one of a parameter associated with at least one zone and a parameter associated with a distribution pattern of sampling points within the at least one zone, wherein the at least one parameter is determined based on at least one of the following:
  (1) a distance between an observer and the image,
  (2) a size of the image, and
  (3) a type of the image;

delineating the at least one zone in the image,
  wherein the at least one zone is delineated based on the determined at least one parameter when the determined parameter is associated with the at least one zone, and
  wherein the at least one zone is delineated based on a predetermined parameter when the determined parameter is not associated with the at least one zone;

disposing the sampling points within the at least one zone,
  wherein the sampling points are disposed based on the determined at least one parameter when the determined parameter is associated with the distribution pattern, and
  wherein the sampling points are disposed based on a predetermined parameter when the determined parameter is not associated with the distribution pattern;

identifying data that indicates a position and an optical characteristic value of each of the sampling points within the at least one zone which are determined at least based on the at least one parameter;

performing Fourier analysis on the data relevant to the at least one zone to obtain an image quality of the at least one zone; and determining a quality of the image based on the image quality of the at least one zone.

* * * * *